(12) United States Patent
Tanaka

(10) Patent No.: US 6,954,587 B2
(45) Date of Patent: Oct. 11, 2005

(54) SWITCHING/MOVING STRUCTURE OF A ZOOM LENS

(75) Inventor: Hitoshi Tanaka, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/775,081

(22) Filed: Feb. 11, 2004

(65) Prior Publication Data

US 2004/0156628 A1 Aug. 12, 2004

(30) Foreign Application Priority Data

Feb. 12, 2003 (JP) ........................................ 2003-034082

(51) Int. Cl.⁷ ............................ G03B 5/00; G02B 15/14
(52) U.S. Cl. ........................ 396/79; 359/695; 359/700; 359/701
(58) Field of Search ............................ 396/72, 79–83; 359/694, 695, 699–701, 704

(56) References Cited

U.S. PATENT DOCUMENTS

| | | | |
|---|---|---|---|
| 6,369,955 B1 | 4/2002 | Enomoto et al. | ........... 359/685 |
| 6,493,512 B2 | 12/2002 | Sato | ............................ 396/83 |
| 6,512,638 B2 | 1/2003 | Sato et al. | ................... 359/701 |
| 2004/0114252 A1 * | 6/2004 | Tanaka et al. | ............... 359/699 |
| 2004/0114253 A1 * | 6/2004 | Nomura et al. | ............. 359/699 |

FOREIGN PATENT DOCUMENTS

| | | | | |
|---|---|---|---|---|
| JP | 2000-275518 | 10/2000 | ........... | G02B/15/16 |
| JP | 2001-215381 | 8/2001 | ............ | G02B/7/04 |

* cited by examiner

Primary Examiner—W. B. Perkey
(74) Attorney, Agent, or Firm—Greenblum & Bernstein, P.L.C.

(57) ABSTRACT

A zoom lens barrel includes a linear guide ring; a moving frame having a male helicoid; a rotatable ring coupled to the linear guide ring; a female helicoid formed on the rotatable ring, and engaged with the male helicoid; a switching ring coupled to the rotatable ring; a switching member; and a switching-member moving groove including a first inclined section, a switching section, a second inclined section and an assembling section. The lead angle of the first inclined section is the same but has an opposite inclination to that of the female helicoid. The follower projection is inserted in the first inclined section. The switching section extends parallel to the optical axis. The second inclined section extends parallel to the first inclined section. The assembling section extends rearwards from a front end of the second inclined section to be parallel to the optical axis.

8 Claims, 38 Drawing Sheets

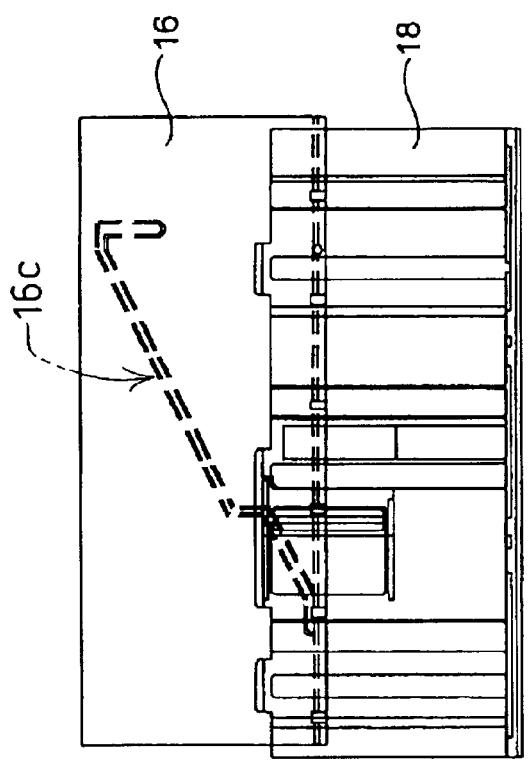
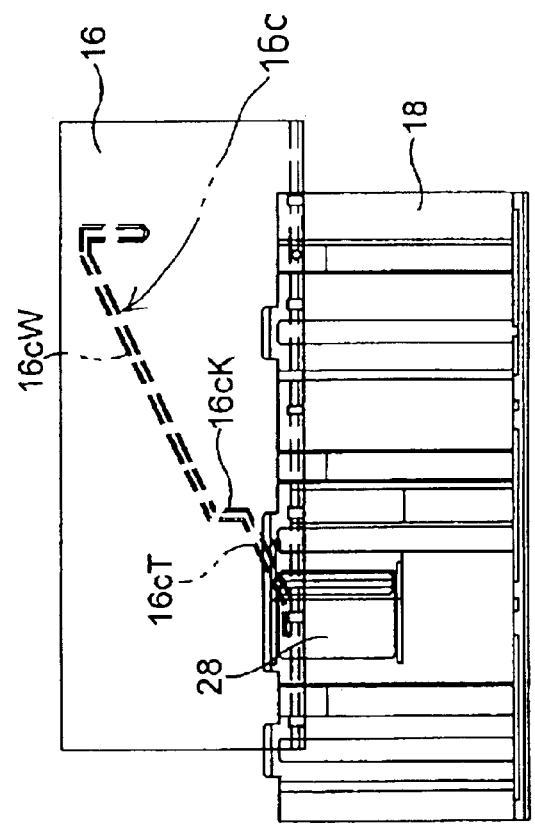

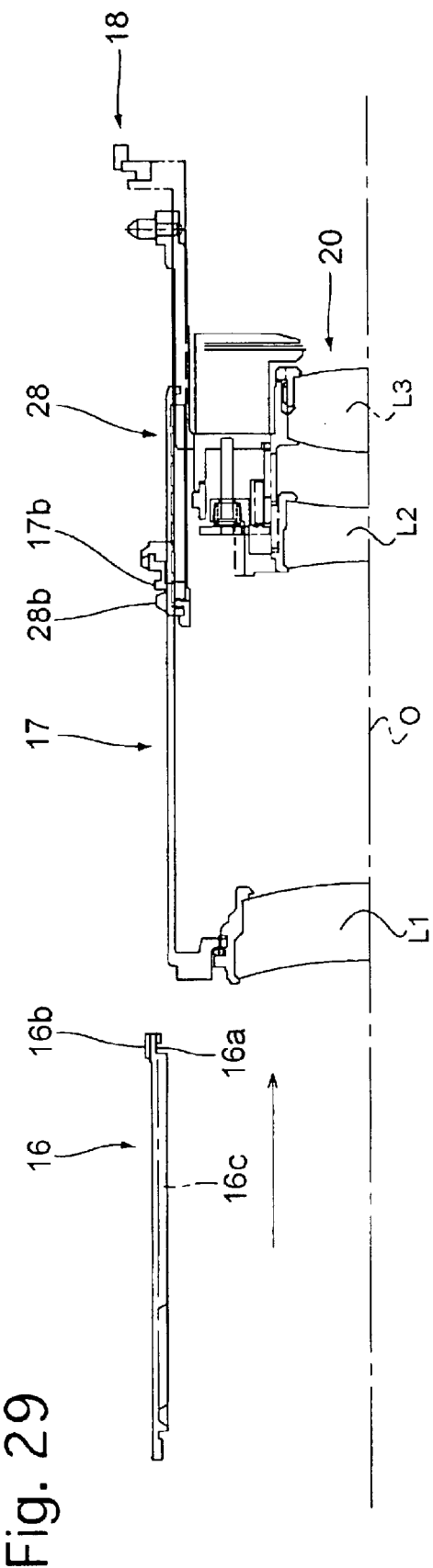
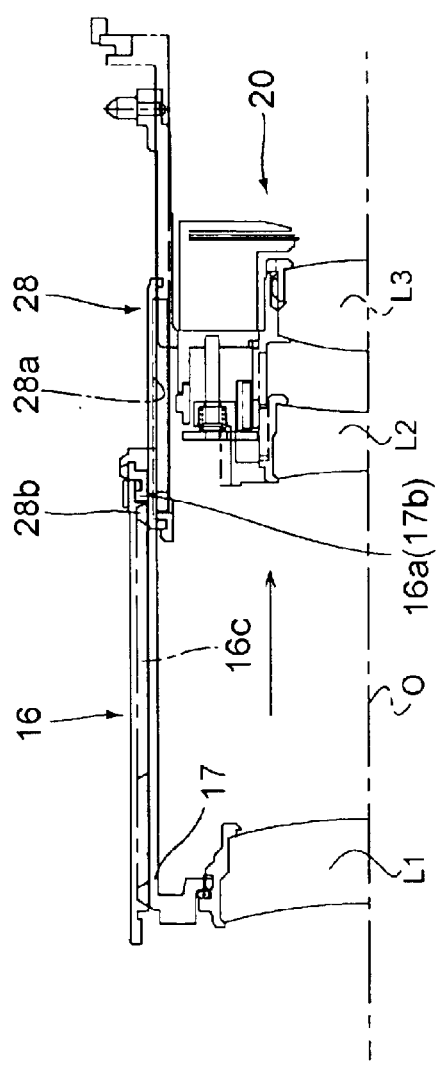
Fig. 29
Fig. 30

SWITCHING/MOVING STRUCTURE OF A ZOOM LENS

BACKGROUND OF THE INVENTION

1. Field of the Invention

The present invention relates to a switching/moving structure of a zoom lens.

2. Description of the Related Art

A lens barrel, wherein a linear guide ring which is supported to be linearly movable along an optical axis without rotating and a rotatable ring are coupled in a first bayonet manner at a predetermined relative rotational position between the linear guide ring and the rotatable ring so that the rotatable ring is freely rotatable relative to the linear guide ring and so that the rotatable ring and the linear guide ring are immovable relative to each other along the optical axis and further wherein a moving frame (lens group support ring) which is supported by the linear guide ring to be linearly movable along the optical axis without rotating and a switching ring which rotates together with the rotatable ring and which is movable relative to the rotatable ring along the optical axis are coupled in a second bayonet manner at a predetermined relative rotational position between the moving frame and the switching ring so that the switching ring is freely rotatable relative to the moving frame and so that the switching ring and the moving frame are immovable relative to each other along the optical axis, is known in the art. The moving frame is provided on an outer peripheral surface thereof with a male helicoid while the rotatable ring is provided on an inner peripheral surface thereof with a female helicoid which is engaged with the male helicoid of the moving frame. A rotation of the rotatable ring causes the moving frame (which supports the first lens group) to move linearly along the optical axis due to engagement of the male helicoid of the moving frame with the female helicoid of the rotatable ring, and further causes lens groups positioned behind the first lens group to move along the optical axis by motion of the cam formed on the rotatable ring.

In addition to the above described structure of the known lens barrel, a zoom lens barrel which is currently under development by the assignee of the present invention includes a structure in which a switching leaf is supported by the linear guide ring to be freely movable in a circumferential direction of the linear guide ring within a predetermined range of movement without moving along the optical axis relative to the linear guide ring while a switching-member moving groove is formed on an inner peripheral surface of the switching ring to be engaged with a follower projection which projects from the switching leaf so that the distance between the second lens group and the third lens group varies by a movement of the switching leaf in a circumferential direction of the linear guide ring. The switching-member moving groove includes a first inclined section (telephoto section), a switching section, and a second inclined section (wide-angle section) in that order from rear to front of the zoom lens barrel. The first inclined section is shaped so that the lead angle thereof is the same as that of the threads of the female helicoid of the rotatable ring and so that the direction of inclination of the first inclined section is opposite to that of the threads of the female helicoid of the rotatable ring. The switching section is shaped to extend parallel to the optical axis from the front end of the first inclined section, and wherein the second inclined section is shaped to extend parallel to the first inclined section from the front end of the switching section.

However, in this zoom lens barrel which is currently under development, it has been proved that neither making the linear guide ring and the rotatable ring coupled in the aforementioned first bayonet manner nor making the moving frame the switching ring coupled in the aforementioned second bayonet manner is possible, and that neither making the moving frame and the rotatable ring coupled in a helicoid manner (i.e., via the aforementioned male and female helicoids) is possible.

SUMMARY OF THE INVENTION

The present invention provides an improved switching/moving structure which makes it possible to perform an assembling work for the above described coupling in the first bayonet manner, the above described coupling in the second bayonet manner and the above described coupling in the helicoid manner without any difficulties arising.

According to the present invention, a zoom lens barrel is provided, including a linear guide ring linearly movable along an optical axis without rotating; a moving frame which is supported by the linear guide ring to be linearly movable along the optical axis without rotating; a male helicoid formed on an outer peripheral surface of the moving frame; a rotatable ring which is coupled to the linear guide ring at a predetermined relative rotational position between the rotatable ring and the linear guide ring to be freely rotatable relative to the linear guide ring without moving along the optical axis relative to the linear guide ring; a female helicoid formed on an inner peripheral surface of the rotatable ring, the female helicoid being engaged with the male helicoid; a switching ring which is coupled to the rotatable ring at a predetermined relative rotational position between the switching ring and the rotatable ring to be freely movable along the optical axis relative to the rotatable ring and rotatable together with the rotatable ring, the switching ring being coupled to the moving frame to be freely rotatable relative to the moving frame without moving along the optical axis relative to the moving frame; a switching member which is supported by the linear guide ring to be freely movable in a circumferential direction of the linear guide ring within a predetermined range of movement without moving along the optical axis relative to the linear guide ring; and a switching-member moving groove which is formed on an inner peripheral surface of the switching ring to be engaged with a follower projection projecting from the switching member. The switching-member moving groove includes a first inclined section, a switching section, a second inclined section and an assembling section, in that order from rear to front of the zoom lens barrel. The first inclined section is shaped so that a lead angle thereof is the same as that of the threads of the female helicoid of the rotatable ring and so that a direction of inclination of the first inclined section is opposite to that of the threads of the female helicoid of the rotatable ring, wherein the follower projection is inserted in the switching-member moving groove via an open rear end of the first inclined section. The switching section is shaped to extend parallel to the optical axis from a front end of the first inclined section. The second inclined section is shaped to extend parallel to the first inclined section from a front end of the switching section. The assembling section extends rearwards from a front end of the second inclined section to be parallel to the optical axis.

It is desirable for the zoom lens barrel to further include a first lens group, a second lens group and a third lens group, wherein each of the first, second and third lens groups is movable along the optical axis; a second/third lens group support unit which supports the second lens group and the third lens group. The moving frame serves as a lens support ring which supports the first lens group. The switching member is associated with the second/third lens group support unit so that forward and reverse movements of the switching member in the circumferential direction of the linear guide ring cause a distance between the second lens group and the third lens group to become wide and narrow, respectively.

It is desirable for the second/third lens unit to be linearly guided along the optical axis to perform zooming and focusing operations.

It is desirable for the linear guide ring to include a guide slot, in which the switching member is positioned, for guiding the switching member in the circumferential direction of the linear guide ring.

It is desirable for the switching member to be positioned in the guide slot so that an outer peripheral surface of the switching member is substantially flush with an outer peripheral surface of the linear guide ring.

It is desirable for the rotatable ring to include at least one cam for moving the second/third lens group support unit by rotation of the rotatable ring.

It is desirable for the switching ring and the moving frame to be coupled in a bayonet manner.

It is desirable for the rotatable ring and the linear guide ring to be coupled in a bayonet manner.

The present disclosure relates to subject matter contained in Japanese Patent Application No.2003-034082 (filed on Feb. 12, 2003) which is expressly incorporated herein by reference in its entirety.

BRIEF DESCRIPTION OF THE DRAWINGS

The invention will be discussed below in detail with reference to the accompanying drawings, in which:

FIGS. 18A through 18D are developed views of the switching ring shown in FIG. 7, the first linear guide ring shown in FIG. 9 and a switching leaf of the second/third lens group support unit shown in FIG. 11 in different states, showing relative transitions among these three elements of the zoom lens barrel from a state at wide-angle extremity shown in FIG. 18A to a state at telephoto extremity shown in FIG. 18D;

FIG. 29 is a longitudinal cross sectional view of the assembly shown in FIG. 28 and the switching ring, showing a manner of fitting the switching ring on the first lens group support ring from the object side;

FIG. 30 is a longitudinal cross sectional view of the assembly and the switching ring which are shown in FIG. 29, showing a state after the switching ring has been fitted on the first lens group support ring with the follower projection of the switching leaf being engaged in the switching groove of the switching ring, and with the guide projection being engaged in a circumferential groove of the switching ring;

DESCRIPTION OF THE PREFERRED EMBODIMENT

Figure 1:
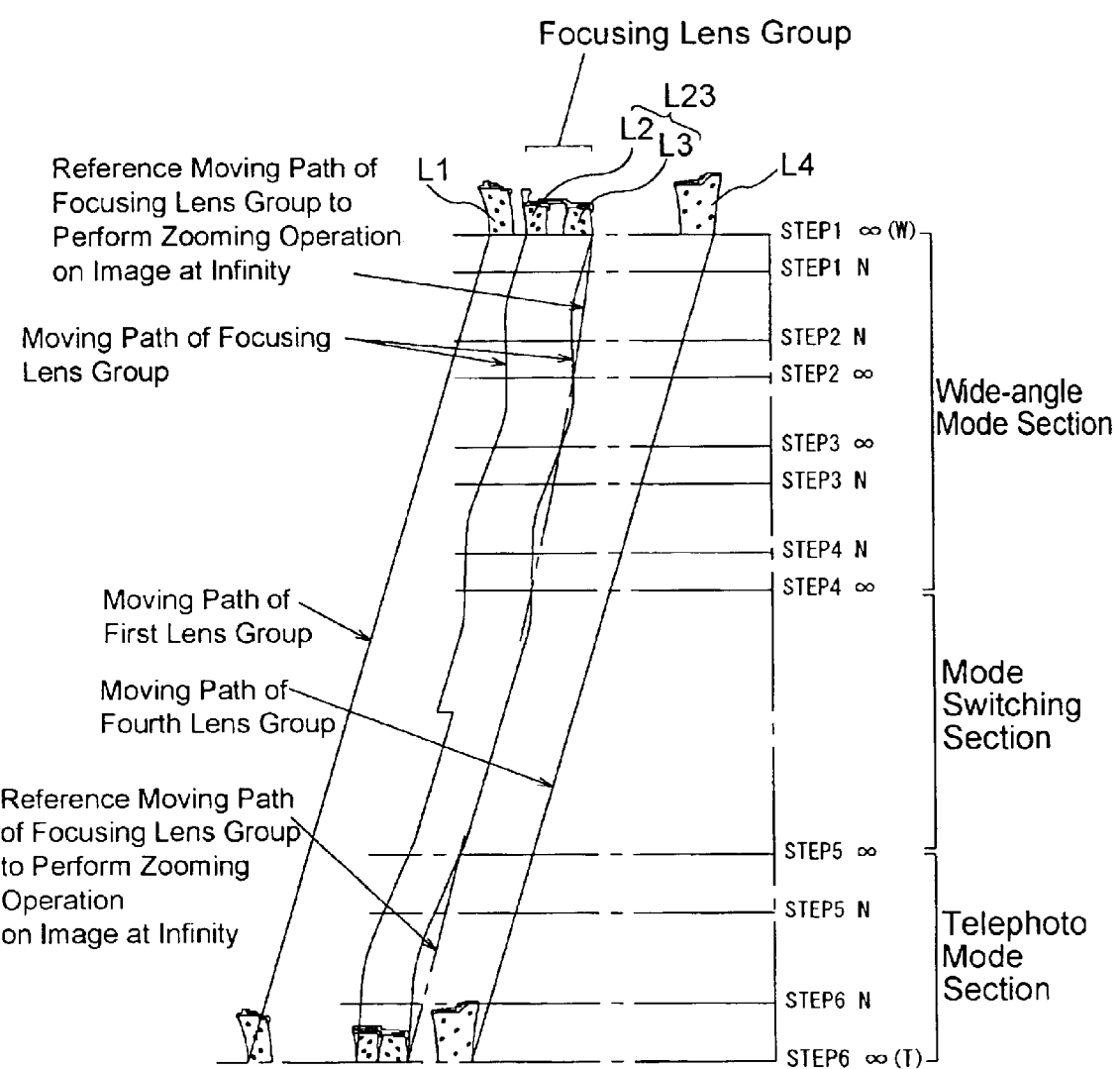
FIG. 1 is a diagram showing lens-group moving paths of a step-zoom lens system (which includes a switching lens group) of a zoom lens barrel according to the present invention.

FIG. 1 shows a zoom lens system provided in an embodiment of a zoom lens barrel according to the present invention. The zoom lens system of the zoom lens barrel 10 includes a positive first lens group L1, and a negative second lens group L2, a positive third lens group L3 and a negative fourth lens group L4, in that order from the object side (left side as viewed in FIG. 3). The second lens group L2 and the third lens group L3 serve as a distance-varying lens group (L23) which changes the distance therebetween at an intermediate range of focal length (mode switching section) from a wide distance in a wide-angle range (wide-angle mode section) to a narrow distance in a telephoto range (telephoto mode section) and vice versa. The second lens group L2 and the third lens group L3 move together without changing the distance therebetween in each of the wide-angle range and the telephoto range. The first lens group L1 and the fourth lens group L4 always move together without changing the distance therebetween. Over the entire zooming range from the short focal length extremity (wide-angle extremity (W)) to the long focal length extremity (telephoto extremity (T)), each of the first lens group L1, the distance-varying lens group L23 and the fourth lens group L4 moves monotonously in a forward direction from the image side (right side as viewed in FIG. 1) to the object side (left side as viewed in FIG. 1) when a zooming operation is carried out from wide-angle extremity to telephoto extremity, or in a retracting direction from the object side to the image side (from left to right as viewed in FIG. 1) when a zooming operation is carried out from telephoto extremity to wide-angle extremity. The present embodiment of the zoom lens barrel 10 is a step-zoom lens barrel which changes the focal length stepwise (specifically, six different focal lengths) when performing a zooming operation, and the distance-varying lens group L23 serves as a focusing lens group in the step-zoom lens barrel. Accordingly, solid lines shown in FIG. 1 which are indicated in association with the first lens group L1, the distance-varying lens group L23 and the fourth lens group L4, represent associated cam diagrams (which include cam diagrams for a focusing operation). A reference moving path of the distance-varying lens group L23 to perform a zooming operation for an image at infinity is represented by one-dot chain lines shown in FIG. 1 which are indicated in association with the distance-varying lens group L23.

This type of zoom lens system having a distance-varying lens group in which the distance between two lens elements varies at an intermediate focal length has been proposed in U.S. Pat. No. 6,369,955 (Japanese Unexamined Patent Publication No. 2000-275518), the assignee of which is the same as that of the present invention. This zoom lens system includes a plurality of movable lens groups which are moved to vary the focal length of the zoom lens system, and at least one lens group of the plurality of movable lens groups includes two sub-lens groups serving as a switching lens group. One of the two sub-lens groups is moveable, along the optical axis of the zoom lens system, to be selectively positioned at one of the movement extremities of the moveable sub-lens group with respect to the other sub-lens group. In a short-focal-length side zooming range covering the short focal length extremity over an intermediate focal length, the moveable sub-lens group is arranged to position at one of the movement extremities thereof. In a long-focal-length side zooming range covering the long focal length extremity over the intermediate focal length, the moveable sub-lens group is arranged to position at the other of the movement extremities thereof. The moving path of the switching lens group having the two sub-lens groups, and the moving paths of the other lens groups of the plurality of movable lens groups are discontinued at the intermediate focal length. The zoom lens system is arranged to form an image on a predetermined image plane in accordance with a position of the moveable sub-lens group. Although the first through fourth lens groups L1 through L4 are shown as single lens elements in the lens-group-moving paths shown in FIG. 1, each of the first through fourth lens groups L1 through L4 generally consists of more than one lens element.

Figure 2:
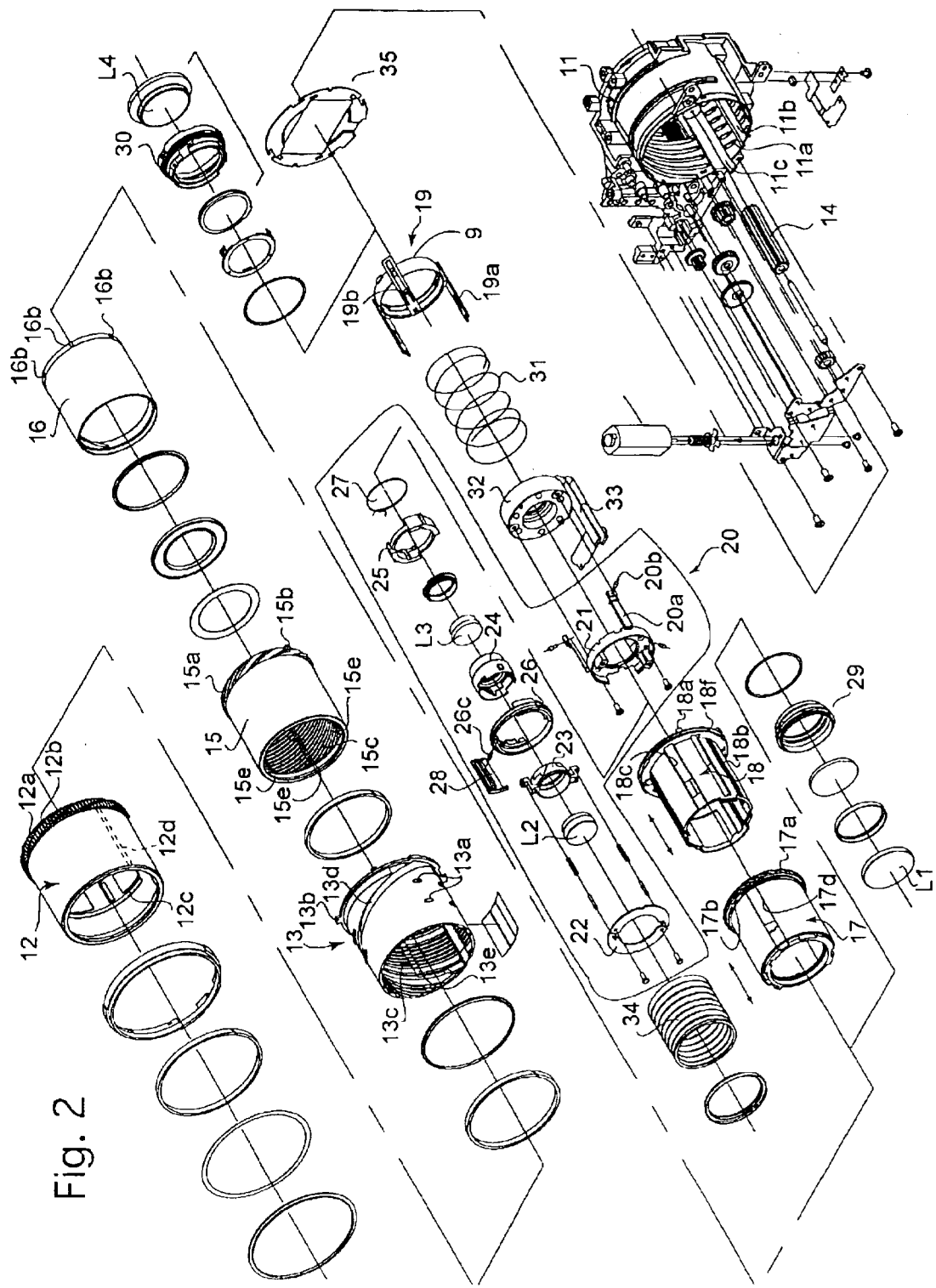
FIG. 2 is an exploded perspective view of an embodiment of the zoom lens barrel according to the present invention.

FIGS. 2 through 19 show the overall structure of the present embodiment of the zoom lens barrel 10. The zoom lens barrel 10 is provided with a stationary barrel 11 which is fixed to a camera body. As shown in FIGS. 2 through 5, the stationary barrel 11 is provided on an inner peripheral surface thereof with a female helicoid 11a and a plurality of linear guide grooves 11b (only one of them appears in FIG. 2) which extend parallel to an optical axis O. As can be understood from FIGS. 3 through 5, the zoom lens barrel 10 is a telescoping type zoom lens which is provided with three external telescoping barrels: a first external barrel (helicoid ring) 12, a second external barrel (cam ring; rotatable ring) 15 and a third external barrel (switching ring) 16, which are concentrically arranged about the optical axis O. The female helicoid 11a of the stationary barrel 11 is engaged with a male helicoid 12a which is formed on an outer peripheral surface of the helicoid ring 12 in the vicinity of the rear end thereof. The zoom lens barrel 10 is provided with a second linear guide ring 13 which is fitted in the helicoid ring 12 to be movable together with the helicoid ring 12 along the optical axis O and to be freely rotatable relative to the helicoid ring 12. Namely, the helicoid ring 12 is provided on an inner peripheral surface thereof with two circumferential grooves 12c which extend parallel to each other in a circumferential direction of the helicoid ring 12, while the second linear guide ring 13 is provided on an outer peripheral surface thereof with a pair of guide projections 13a which are respectively engaged in the two circumferential grooves 12c of the helicoid ring 12 to be freely movable therein. The pair of guide projections 13a, which are aligned in a direction parallel to the optical axis O as shown in FIG. 2, remain respectively engaged with the two circumferential grooves 12c when the zoom lens barrel 10 is in use. The second linear guide ring 13 is provided at the rear end thereof with a plurality of radial projections 13b (only one of them appear in FIG. 2) which extend radially outwards to be engaged in the plurality of linear guide grooves 11b of the stationary barrel 11, respectively.

The helicoid ring 12 is provided on the thread of the male helicoid 12a with a spur gear 12b which is engaged with a drive pinion 14. The drive pinion 14 is provided in a recessed portion 11c (see FIG. 2) formed on an inner peripheral surface of the stationary barrel 11. The drive pinion 14 is supported by the stationary barrel 11 to be freely rotatable in the recessed portion 11c on an axis of the drive pinion 14. Accordingly, forward and reverse rotations of the drive pinion 14 cause the helicoid ring 12 to move forward rearward along the optical axis O while rotating about the optical axis O, thus causing the second linear guide ring 13 to move linearly along the optical axis O along with the helicoid ring 12.

Figure 6:
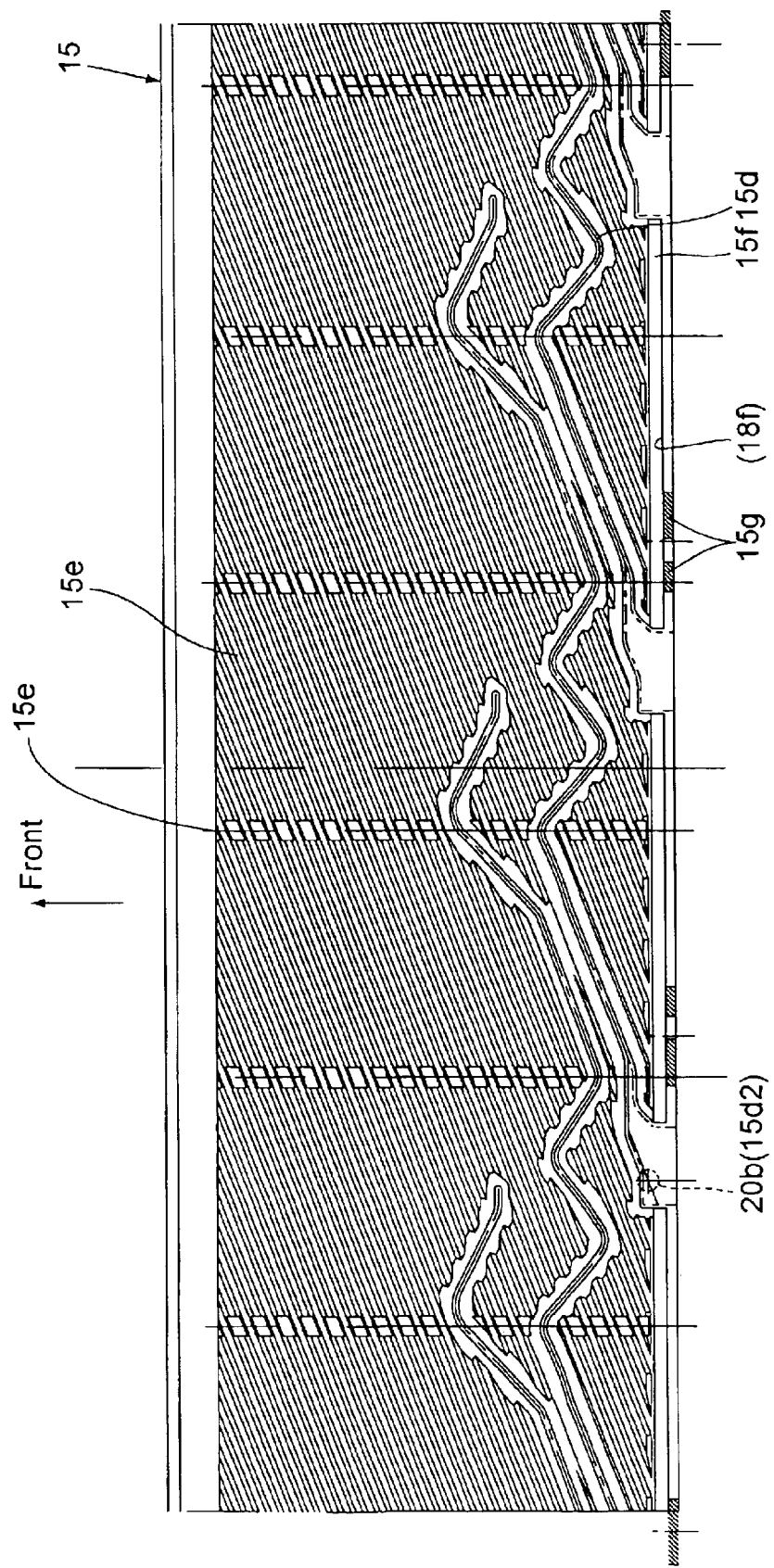
FIG. 6 is a developed view of an inner peripheral surface of a cam ring of the zoom lens barrel shown in FIG. 2.
Figure 19:
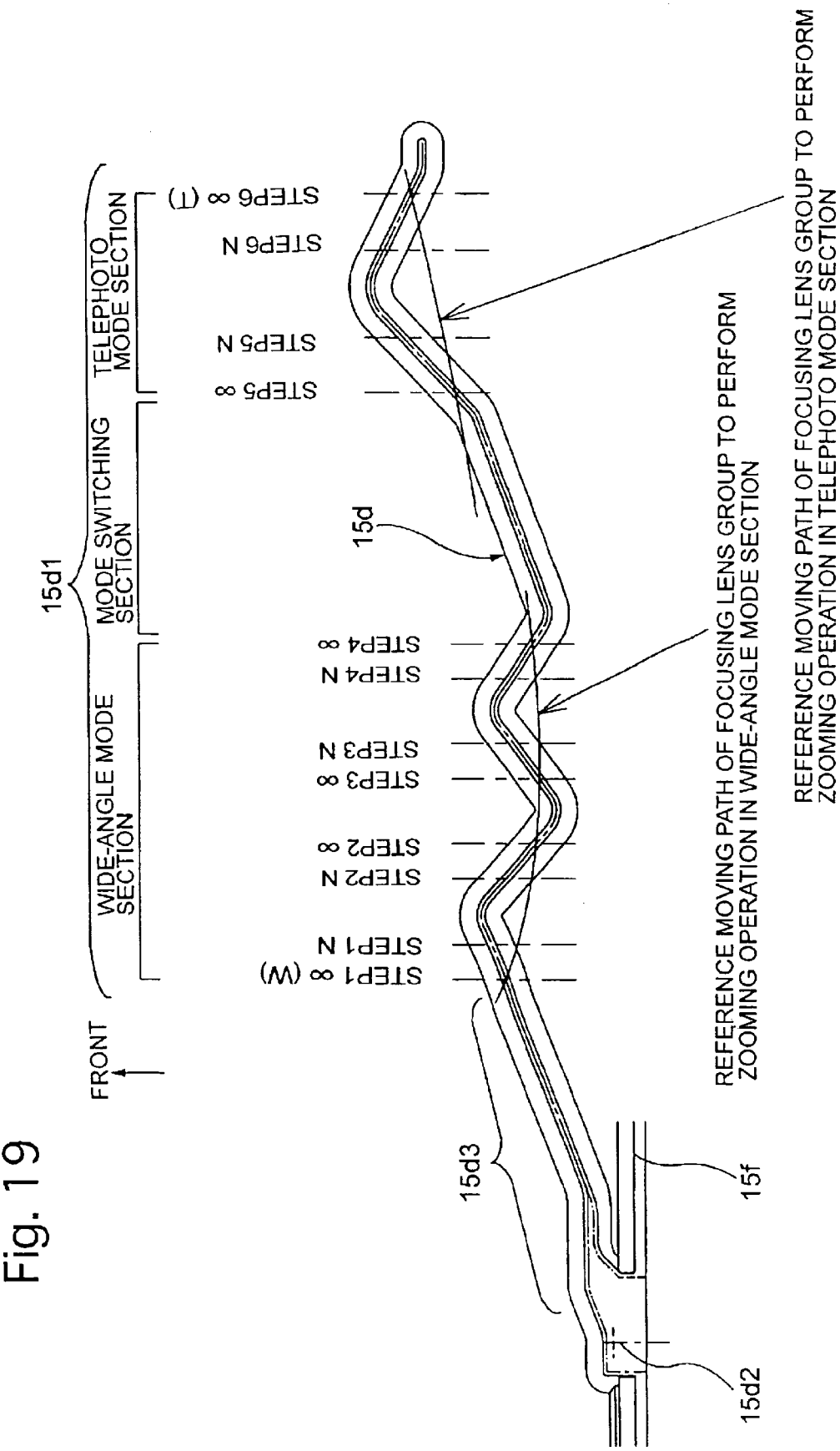
FIG. 19 is a developed view of a cam groove provided on a cam ring of the zoom lens barrel.

The cam ring 15 is fitted inside the second linear guide ring 13. FIG. 6 is a developed view of an inner peripheral surface of the cam ring 15. The cam ring 15 is provided, on an outer peripheral surface thereof in the vicinity of the rear end of the cam ring 15, with a guide pin 15b which extends radially outwards from a portion of the male helicoid 15a. The male helicoid 15a is engaged with a female helicoid 13c formed on an inner peripheral surface of the second linear guide ring 13, while the guide pin 15b is engaged in a clearance slot 13d which is formed on the second linear guide ring 13 to extend in a direction both in a circumferential direction of the second linear guide ring 13 and in the optical axis direction (the direction of the optical axis O). The guide pin 15b passes through the clearance slot 13d to be engaged in a linear guide groove 12d, which is formed on an inner peripheral surface of the helicoid ring 12d (shown by broken lines in FIG. 2) and extends parallel to the optical axis O. Therefore, a rotation of the helicoid ring 12 causes the cam ring 15 to move along the optical axis O while rotating about the optical axis O due to the engagement of the female helicoid 13c with the male helicoid 15a. The cam ring 15 is provided on an inner peripheral surface thereof with a female helicoid 15c (see FIGS. 2 and 6) and a set of three bottomed cam grooves 15d (only one of them is shown in FIG. 19).

Figure 7:
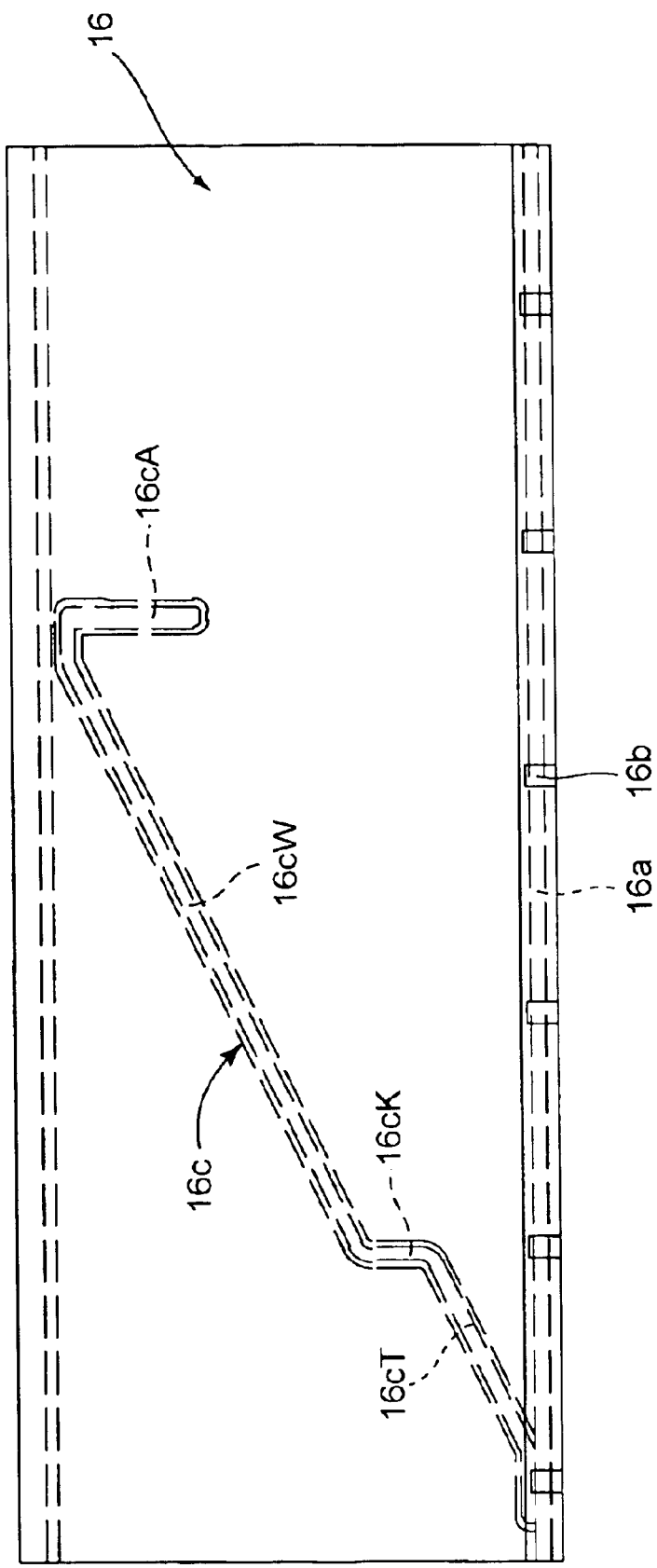
FIG. 7 is a developed view of an inner peripheral surface of a switching ring (third external barrel) of the zoom lens barrel shown in FIG. 2.
Figure 8:
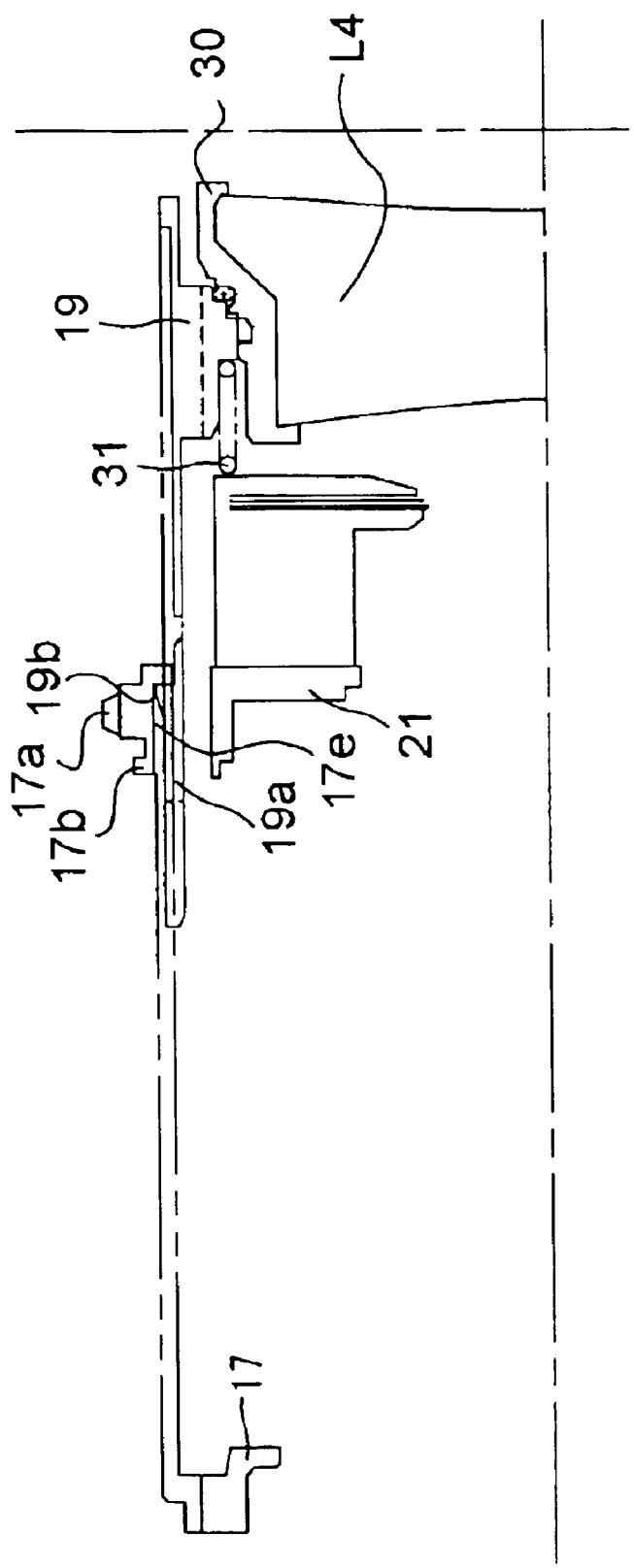
FIG. 8 is a longitudinal cross sectional view of a portion of the zoom lens barrel shown in FIG. 2, showing a structure of engagement of a first lens group support ring with a fourth lens frame, showing only an upper half of the portion of the zoom lens barrel from the optical axis.

The zoom lens barrel 10 is provided inside the cam ring 15 with three concentric rings: the switching ring 16, a first lens group support ring (moving frame) 17 and a first linear guide ring 18, which fit inside each other in that order in a radially inward direction. The first lens group support ring 17 supports the first lens group L1. FIG. 7 is a developed view of the switching ring 16. The switching ring 16 and the first lens group support ring 17 move together along the optical axis O while the switching ring 16 is allowed to rotate freely about the optical axis O relative to the first lens group support ring 17. The first lens group support ring 17 is provided, on an outer peripheral surface thereof in the vicinity of the rear end of the first lens group support ring 17, with a male helicoid 17a, and is further provided immediately in front of the male helicoid 17a with a guide projection 17b. The guide projection 17b is engaged in a circumferential groove 16a (see FIG. 7) which is formed on an inner peripheral surface of the switching ring 16 in the vicinity of the rear end thereof to allow a relative rotation between the guide projection 17b and the circumferential groove 16a about the optical axis O.

The male helicoid 17a of the first lens group support ring 17 is engaged with the female helicoid 15c of the cam ring 15. The cam ring 15 is provided on an inner peripheral surface thereof with a set of six rotation transfer grooves 15e (only three of them appear in FIG. 2) which extend parallel to the optical axis O, while the switching ring 16 is provided, on an outer peripheral surface thereof in the vicinity of the rear end of the switching ring 16, with a set of six rotation transfer projections 16b (only three of them appear in FIG. 2) which project radially outwards to be engaged in the set of six rotation transfer grooves 15e, respectively.

On the other hand, the second linear guide ring 13 is provided on an inner peripheral surface thereof with a plurality of linear guide grooves 13e (only one of them appears in FIG. 2) which extend parallel to the optical axis O, while the first linear guide ring 18 is provided, on an outer peripheral surface thereof in the vicinity of the rear end of the first linear guide ring 18, with a plurality of guide projections 18a (only two of them appear in FIG. 9) which project radially outwards to be engaged in the plurality of linear guide grooves 13e, respectively. The first linear guide ring 18 is provided on an outer peripheral surface thereof with a linear guide groove 18b (see FIG. 9) which extend parallel to the optical axis O, while the first lens group support ring 17 is provided, on an inner peripheral surface thereof in the vicinity of the rear end of the first lens group support ring 17, with a linear guide projection 17c which projects radially inwards to be engaged in the linear guide groove 18b (see FIG. 9). Therefore, each of the second linear guide ring 13, the first linear guide ring 18 and the first lens group support ring 17 is movable along the optical axis O without relatively rotating about the optical axis O. The first linear guide ring 18 is provided in the immediate vicinity of the rear end thereof with an outer flange 18f (see FIG. 9) which projects radially outwards to be engaged in a circumferential groove 15f (see FIG. 6) which is formed on an inner peripheral surface of the cam ring 15 in the immediate vicinity of the rear end thereof so that a relative rotation between the outer flange 18f and the circumferential groove 15f about the optical axis O is possible, and so that the outer flange 18f and the circumferential groove 15f move together in the optical axis direction.

Therefore, if a rotation of the cam ring 15 is transferred to the switching ring 16 via the engagement of the set of six rotation transfer projections 16b with the set of six rotation transfer grooves 15e, the first lens group support ring 17, which has the male helicoid 17a engaged with the male helicoid 15c of the cam ring 15 and is prevented from rotating by the first linear guide ring 18, moves along the optical axis O.

The zoom lens barrel 10 is provided in the rear of the first lens group support ring 17 with a fourth lens group support ring 19. The fourth lens group support ring 19 is supported by the first lens group support ring 17 to be freely movable linearly along the optical axis O without rotating about the optical axis O relative to the first lens group support ring 17. The fourth lens group support ring 19 supports the fourth lens group L4, and is provided on an outer peripheral surface thereof with a set of three axial arms 19a which extend parallel to the optical axis O. The first lens group support ring 17 is provided with a set of three linear guide slots 17d which extend parallel to the optical axis O. The fourth lens group support ring 19 and the first lens group support ring 17 are engaged with each other with the set of three axial arms 19a being slidably engaged in the set of three linear guide slots 17d, respectively.

Figure 9:
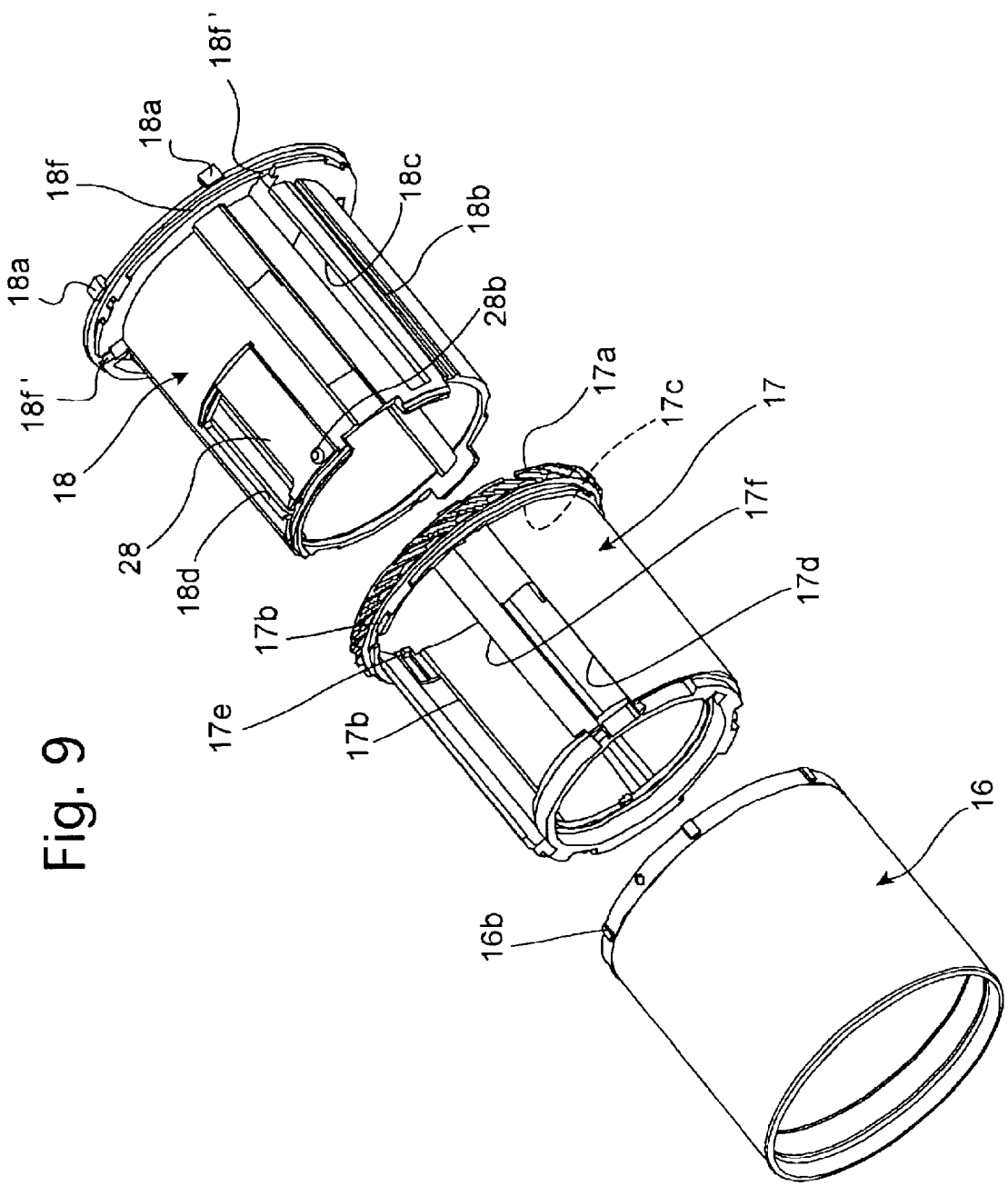
FIG. 9 is a developed perspective view of the switching ring, the first lens group support ring and a first linear guide ring of the zoom lens shown in FIG. 2.
Figure 10:
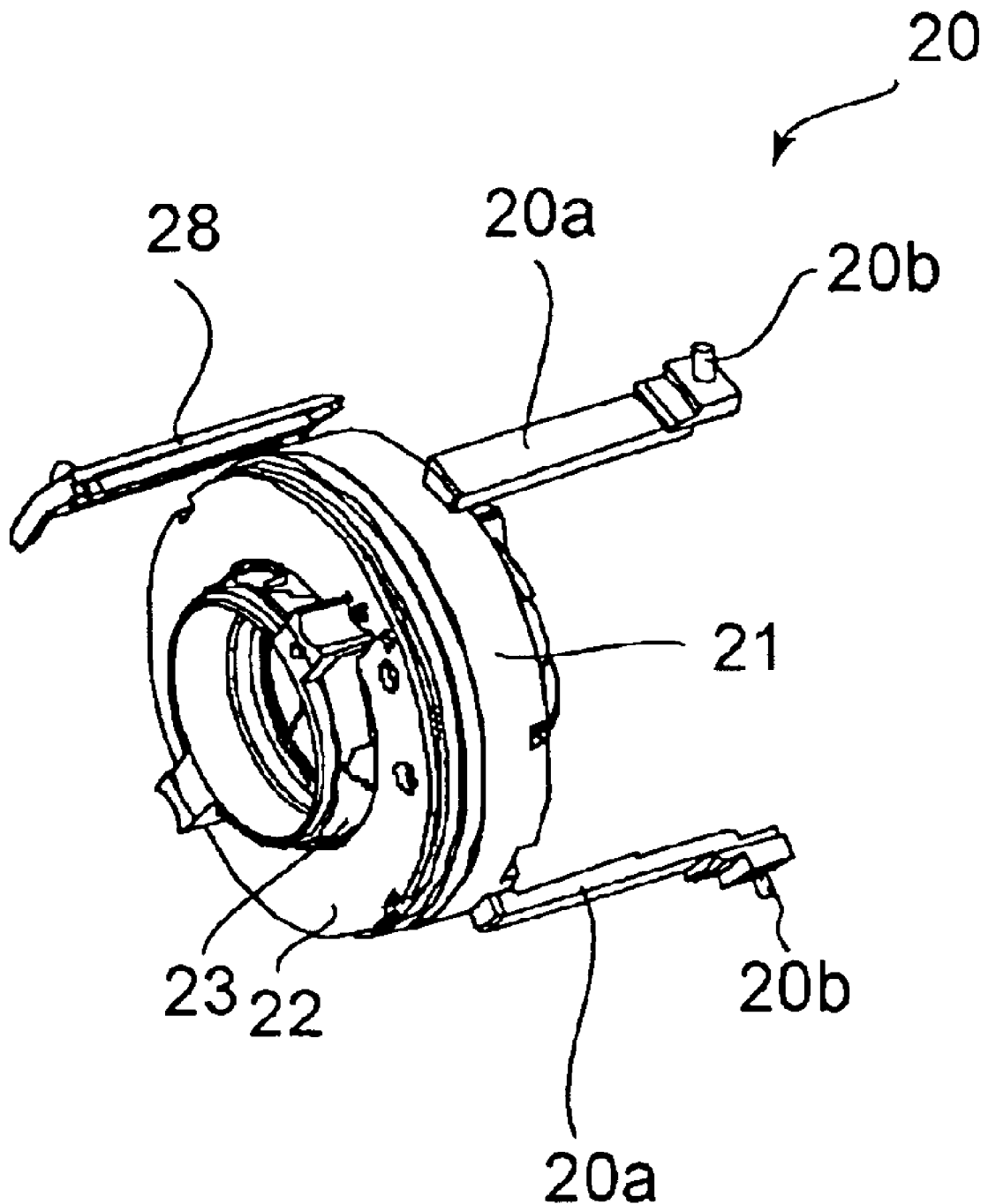
FIG. 10 is a perspective view of a second/third lens group support unit of the zoom lens barrel shown in FIG. 2.
Figure 11:
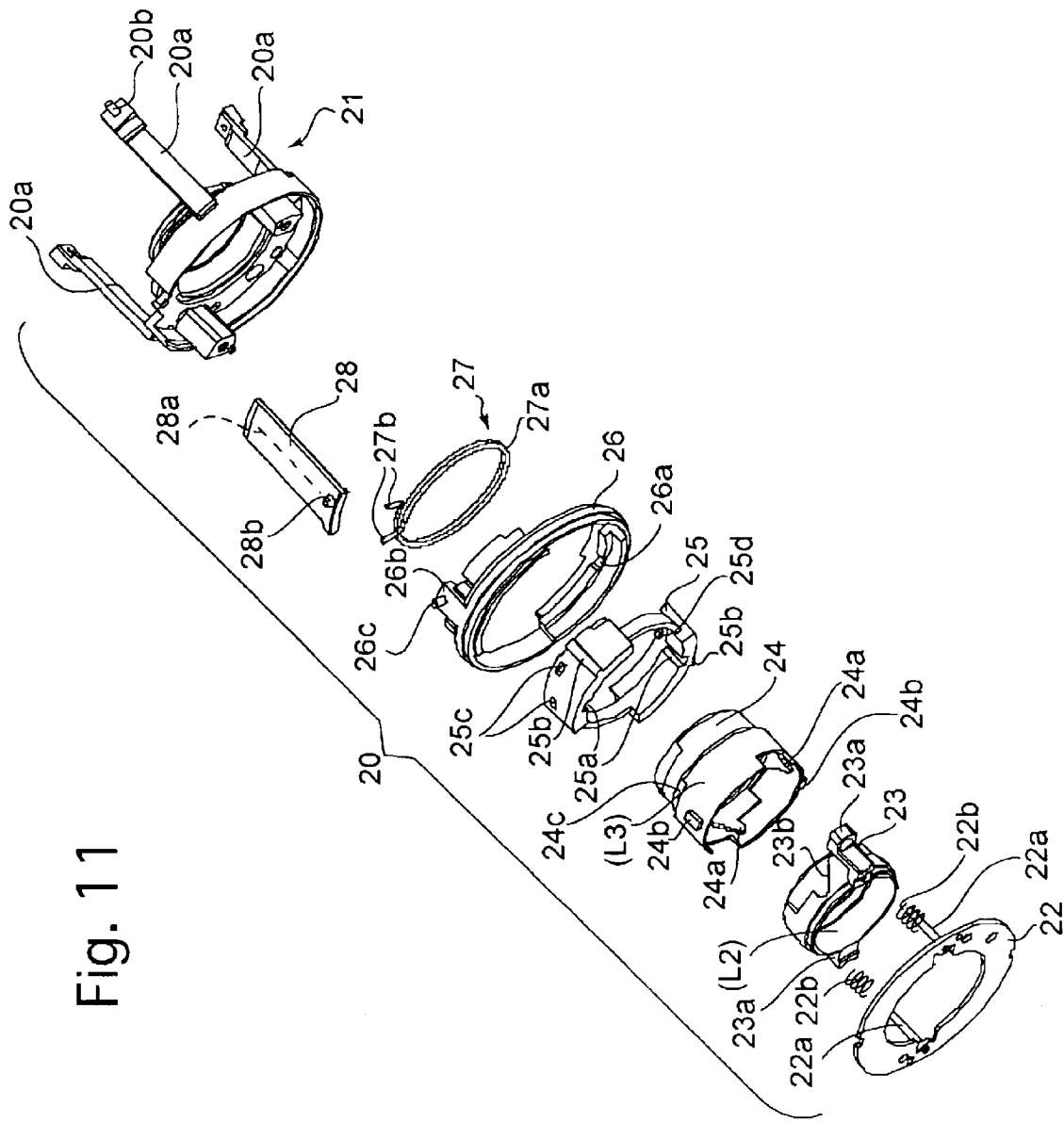
FIG. 11 is an exploded perspective view of the second/third lens group support unit shown in FIG. 10.
Figure 12:
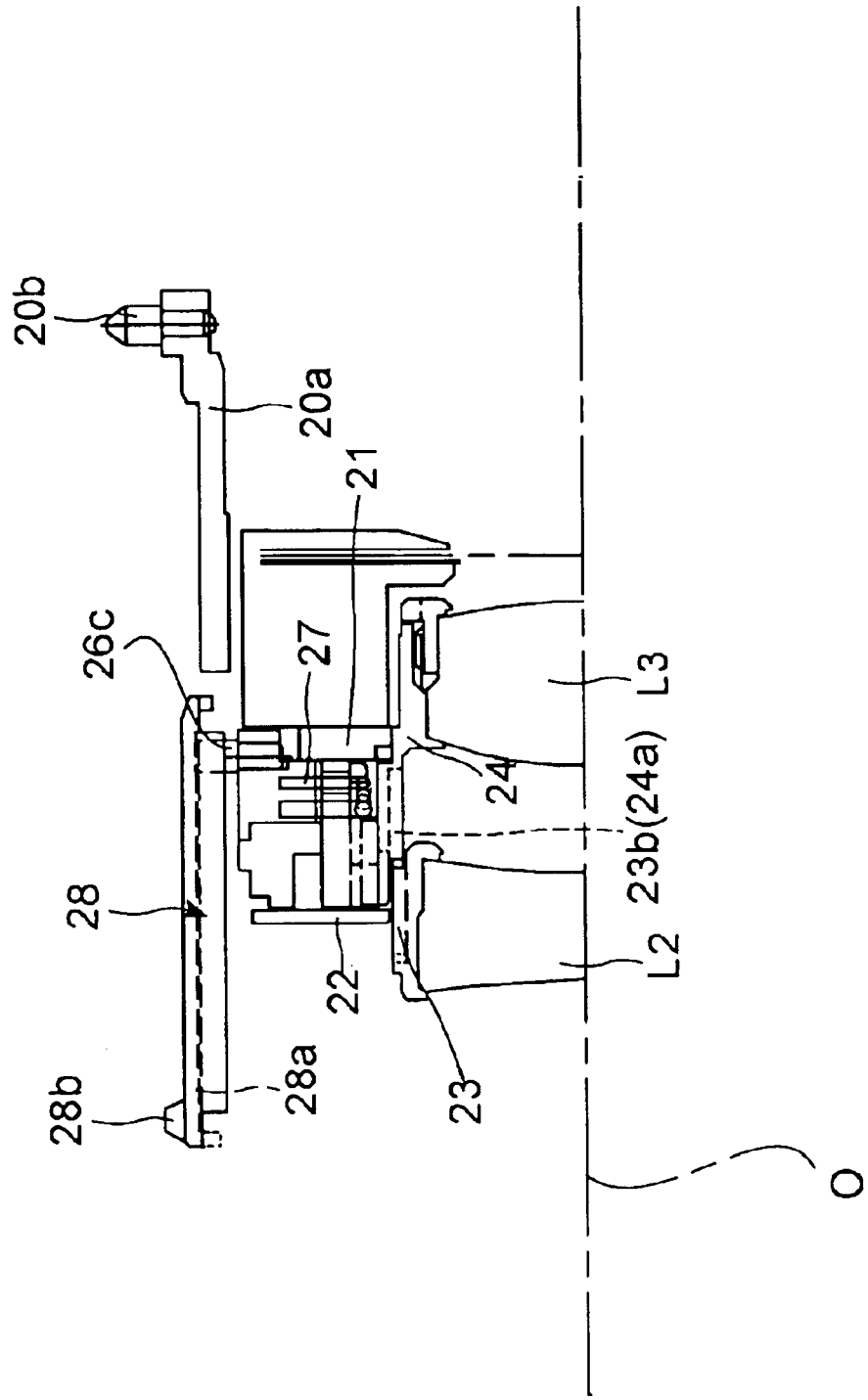
FIG. 12 is a longitudinal cross sectional view of a switching mechanism of the zoom lens barrel shown in FIG. 2 that includes the second/third lens group support unit shown in FIG. 10, showing only an upper half of the switching mechanism from the optical axis.
Figure 13:
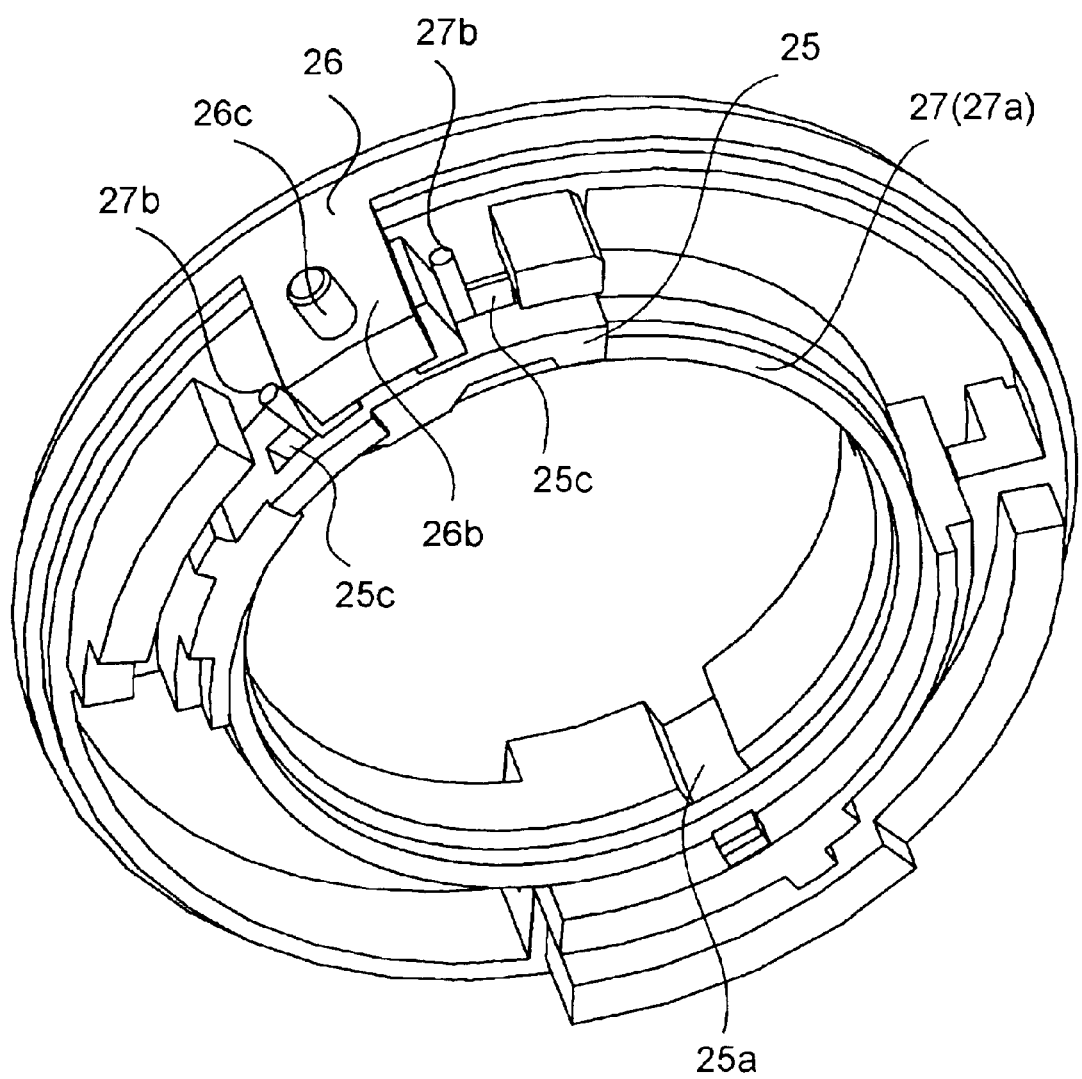
FIG. 13 is a perspective view of an overtravel mechanism incorporated in the second/third lens group support unit shown in FIGS. 10 and 11.

The zoom lens barrel 10 is provided in association with the first linear guide ring 18 with a second/third lens group support unit (ring member) 20 (see FIGS. 10 and 11) which supports the second lens group L2 and the third lens group L3. The second/third lens group support unit 20 is provided on a second/third lens group moving ring 21 thereof with a set of three guide arms 20a which extend parallel to the optical axis O. The first linear guide ring 18 is provided with a set of three linear guide slots 18c in which the set of three guide arms 20a are slidably engaged. A set of three cam followers 20b are fixed to the set of three guide arms 20a in the vicinity of the rear ends thereof, respectively. Each cam follower 20b projects radially outwards to be engaged in the associated one of the three bottomed cam grooves 15d of the cam ring 15. FIG. 10 shows the second/third lens group support unit 20 in an assembled state, while FIG. 11 shows the second/third lens group support unit 20 in a disassembled state. As shown in FIGS. 6 and 19, each of the three bottomed cam grooves 15d consists of a photographing section 15d1 (which includes the wide-angle mode section, the mode switching section and the telephoto mode section which are shown in FIG. 19) for moving the second/third lens group support unit 20 to a ready-to-photograph position among a plurality of ready-to-photograph positions, an accommodation section 15d2 for positioning the second/third lens group support unit 20 to an accommodation position thereof (in which no photographing operation is performed), and a transfer section 15d3, which is positioned between the photographing section 15d1 and the accommodation section 15d2, for moving the second/third lens group support unit 20 between the photographing section 15d1 and the accommodation section 15d2. The entire portion of the photographing section 15d1 and the entire portion of the transfer section 15d3 except for an end portion (rear end portion) of the transfer section 15d3 in the vicinity of the accommodation section 15d2 are formed as narrow-width cam portions in which the associated cam follower 20b is engaged with a minimum clearance. The accommodation section 15d2 and the aforementioned rear end portion of the transfer section 15d3 are formed as open cam portions which are open at a rear end surface of the cam ring 15. Accordingly, a rotation of the cam ring 15 causes the second/third lens group support unit 20 to move linearly along the optical axis O in accordance with the contours of the set of three cam grooves 15d. The outer flange 18f of the first linear guide ring 18, which is engaged in the circumferential groove 15f of the cam ring 15 so that a relative rotation between the outer flange 18f and the circumferential groove 15f about the optical axis O is possible, is provided with a set of three cut-out portions 18f'. The set of three cut-out portions 18f' are positioned behind the accommodation sections 15d2 of the set of three cam grooves 15 to allow the set of three cam followers 20b to enter the set of three cut-out portions 18f' (see FIGS. 3, 9 and 18A; only two of them appear in FIG. 9), respectively, so that each cam follower 20b can move rearward beyond the front end surface of the outer flange 18f when the second/third lens group support unit 20 retracts to its retracted position (accommodation position).

The zoom lens barrel 10 is provided between the second/third lens group support unit 20 and the fourth lens group support ring 19 with a compression coil spring (biasing device) 31 for biasing the fourth lens group support ring 19 rearward. Each of the set of three axial arms 19a is provided with a claw portion 19b (see FIG. 8) which is engaged with an associated inward projection 17e (see FIGS. 8 and 9) which is formed on the first lens group support ring 17 at the rear end thereof to determine the rear limit for the axial movement of the fourth lens group support ring 19 with respect to the first lens group support ring 17 against the spring force of the compression coil spring 31 to prevent the fourth lens group support ring 19 from coming out of the first lens group support ring 17. The fourth lens group support ring 19 remains at its rearmost position with respect to the first lens group support ring 17 in a ready-to-photograph state of the zoom lens barrel 10.

Operations of the above described portions of the zoom lens barrel 10 will be hereinafter discussed before the structure of the second/third lens group support unit 20 is discussed in detail. Rotating the helicoid ring 12 by rotation of the drive pinion 14 causes the helicoid ring 12 to move along the optical axis O while rotating about the optical axis O, thus causing the second linear guide ring 13, which is prevented from rotating, to move along the optical axis O together with the helicoid ring 12. This rotation of the helicoid ring 12 is transferred to the cam ring 15 to move the cam ring 15 along the optical axis O together with the first linear guide ring 18, which is linearly guided, while rotating about the optical axis O. At the same time, this rotation of the cam ring 15 causes the switching ring 16 to move together with the first lens group support ring 17, which is linearly guided, along the optical axis while rotating about the optical axis O with respect to the first lens group support ring 17. When the first lens group support ring 17 moves forward from its retracted position shown in FIG. 4, the compression coil spring 31 resiliently expands gradually to position the fourth lens group support ring 19 at its rearmost position with respect to the first lens group support ring 17. This rearmost position corresponds to wide-angle extremity in the zooming range. Thereafter the first lens group support ring 17 and the fourth lens group support ring 19 move together. Since the first lens group support ring 17 and the fourth lens group support ring 19 hold the first lens group L1 and the fourth lens group L4, respectively, the first lens group L1 and the fourth lens group L4 move together along the optical axis O to be linearly proportional to the angle of rotation of the helicoid ring 12 (without varying the distance between the first lens group L1 and the fourth lens group L4) as shown in FIG. 1.

Figure 3:
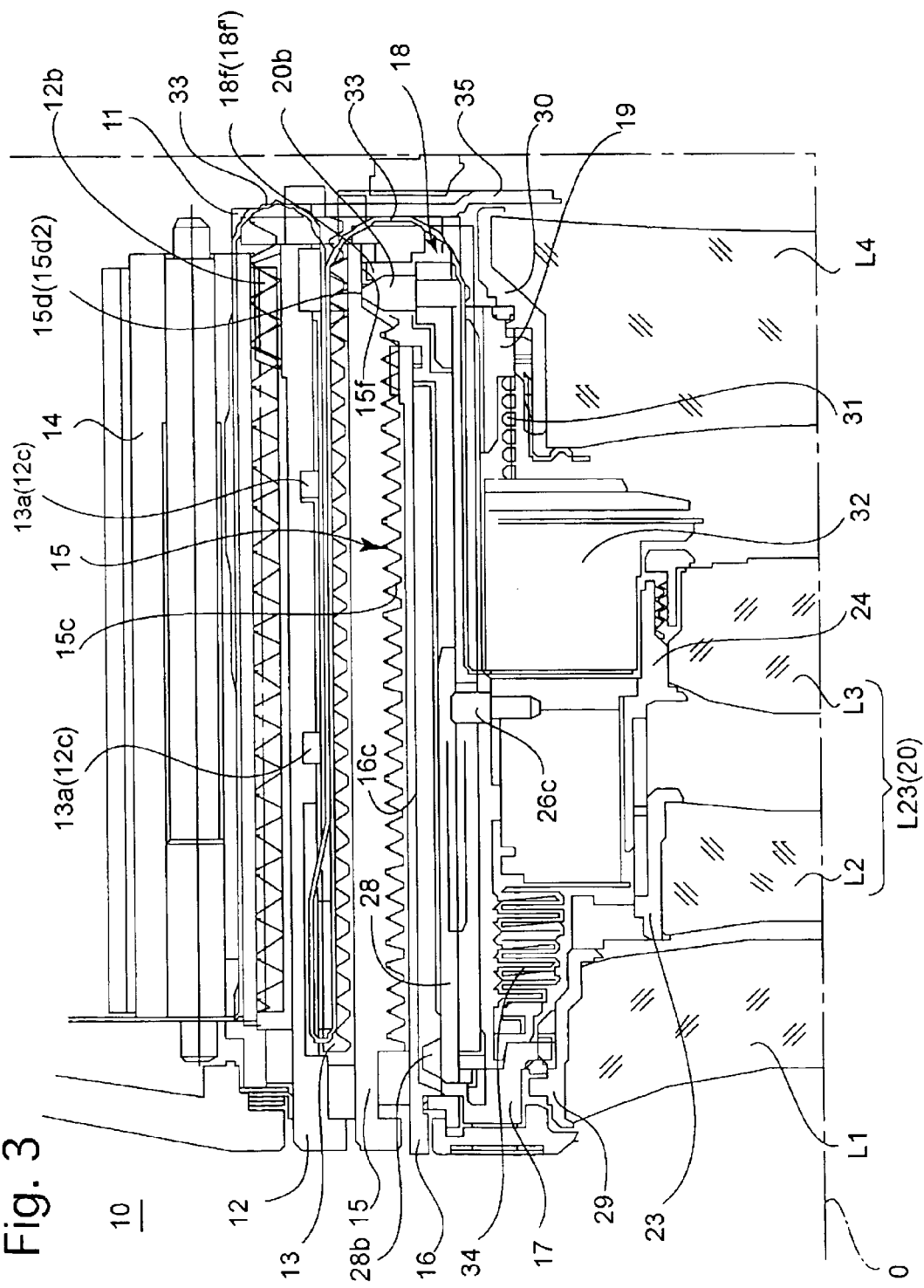
FIG. 3 is a longitudinal cross sectional view of the zoom lens barrel shown in FIG. 2 in a retracted state, showing only an upper half of the zoom lens barrel from an optical axis.
Figure 4:
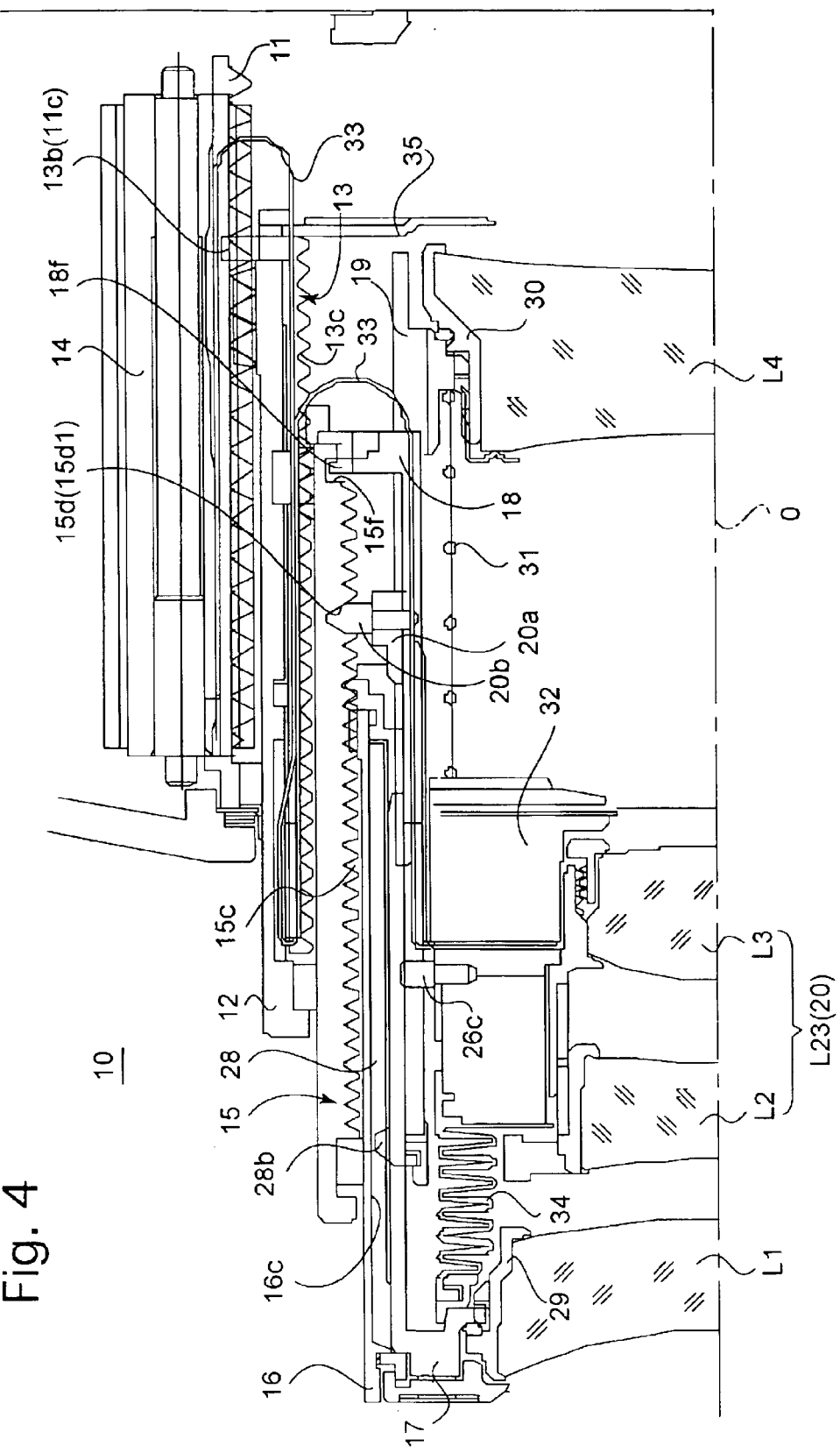
FIG. 4 is a longitudinal cross sectional view of the zoom lens barrel shown in FIG. 2 at the wide-angle extremity which is focused on an image at infinity, showing only an upper half of the zoom lens barrel from the optical axis.
Figure 5:
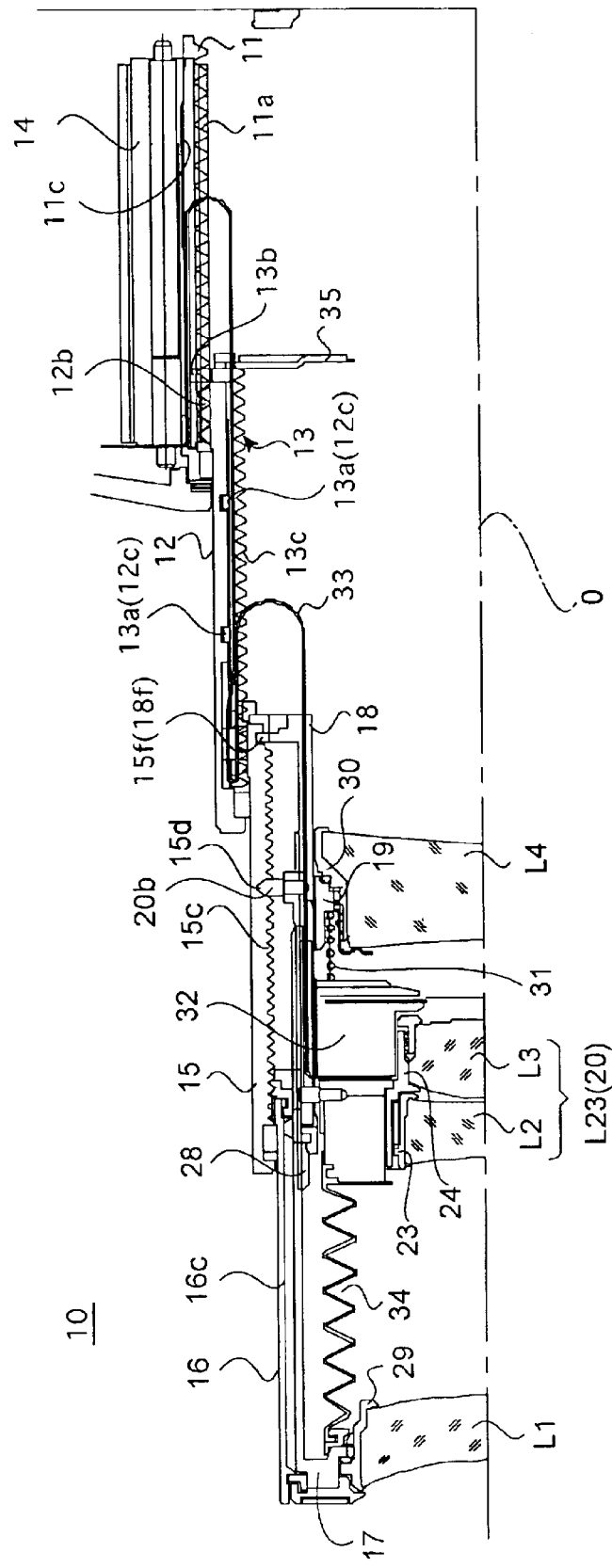
FIG. 5 is a longitudinal cross sectional view of the zoom lens barrel shown in FIG. 2 at telephoto extremity which is focused on an image at infinity, showing only an upper half of the zoom lens barrel from the optical axis.

As can be clearly seen in FIG. 3, a front end surface of the second/third lens group support unit 20 is positioned very closely to or comes in contact with a rear end surface of a first lens frame 29 (by which the first lens group L1 is fixed to be supported) when the zoom lens barrel 10 is in the retracted position. The first lens frame 29 is fixed to a front end portion of the first lens group support ring 17. In the retracted state shown in FIG. 3, since the rear of the accommodation section 15d2 of each cam groove 15d is open, each cam follower 20b is disengaged from a front cam surface (front cam edge) in the associated cam groove 15d to become capable of moving rearward to thereby reduce the length of the zoom lens barrel 10 in the retracted state when the second/third lens group support unit 20 is pressed rearward by the first lens frame 29 against the spring force of the compression coil spring 31. At the same time, a fourth lens frame 30, to which the fourth lens group L4 is fixed to be supported thereby, is moved rearward to the position where the fourth lens frame 30 contacts with a light shield plate 35 (see FIG. 3) by the spring force of the compression coil spring 31. The fourth lens frame 30 is fixed to the fourth lens group support ring 19, while the light shield plate 35 is fixed to a rear end surface of the helicoid ring 12.

On the other hand, the axial position of the second/third lens group support unit 20 is determined by the set of three bottomed cam grooves 15d, which are formed on an inner peripheral surface of the cam ring 15. The second/third lens group support unit 20 supports the second lens group L2 and the third lens group L3, while a continuous rotation of the cam ring 15 together with the switching ring 16 provides the second lens group L2 and the third lens group L3 respective moving paths thereof shown in FIG. 1. The structure of the second/third lens group support unit 20, and associated structures of the cam ring 15 and the switching ring 16 will be hereinafter discussed in detail with reference to FIGS. 9 through 18D.

The set of three guide arms 20a are formed on the second/third lens group moving ring 21 of the second/third lens group support unit 20, while the set of three cam followers 20b are fixed to the set of three guide arms 20a, respectively. The second/third lens group support unit 20 is provided at a front end thereof with a front-end pressing ring plate 22, and is provided between the second/third lens group moving ring 21 and the front-end pressing ring plate 22 with the second lens frame 23, a third lens frame 24, a differential linking ring 25, a differential ring 26 and a differential spring 27 which are accommodated in the distance between the second/third lens group moving ring 21 and the front-end pressing ring plate 22, in that order from the object side. The third lens group L3 is fixed to the third lens frame 24 to be supported thereby. A pair of guide pins 22a are fixed to the front-end pressing ring plate 22 to extend rearward to be parallel to the optical axis O. The second lens frame 23 is provided with a pair of guide bosses 23a which are slidably fitted on the pair of guide pins 22a, respectively. A pair of compression coil springs 22b are loosely fitted on the pair of guide pins 22a to press the second lens frame 23 rearward.

Each of the third lens frame 24, the differential linking ring 25 and the differential ring 26 is rotatable about the optical axis O. The second lens frame 23 and the third lens frame 24 have cylindrical portions so that the cylindrical portion of the third lens frame 24 is fitted on the cylindrical portion of the second lens frame 23. The second lens frame 23 is provided on an outer peripheral surface of the cylindrical portion thereof with a set of four inclined cam edges 23b (only one of them appears in FIG. 11) while the third lens frame 24 is provided on an inner peripheral surface of the cylindrical portion thereof with a set of four cam followers 24a (only two of them appears in FIG. 11) which are engaged with the set of four inclined cam edges 23b, respectively. Each cam edge 23b extends linearly, and is inclined with respect to both a circumferential direction of the second lens frame 23 and the optical axis direction. The third lens frame 24 is provided on an outer peripheral surface thereof with a pair of rotation transfer projections 24b while the differential linking ring 25 is provided on an inner peripheral surface thereof with a pair of rotation transfer grooves 25a in which the pair of rotation transfer projections 24b are engaged, respectively, so that the third lens frame 24 and the differential linking ring 25 rotate together at all times. The third lens frame 24 is always pressed rearward by the spring force of the pair of compression coil springs 22b to be in pressing contact with the second/third lens group moving ring 21 to determine the position of the third lens frame 24 in the optical axis direction with respect to the second/third lens group moving ring 21. The differential ring 26 is provided on an inner peripheral surface thereof with a pair of forced-rotation transfer grooves 26a (only one of them appears in FIG. 11) while the differential linking ring 25 is provided on an outer peripheral surface thereof with a pair of forced-rotation transfer projections 25b which are engaged in the pair of forced-rotation transfer grooves 26a, respectively, with a predetermined circumferential clearance between each forced-rotation transfer projection 25b and the associated forced-rotation transfer groove 26a (see FIGS. 16 and 17). The second lens frame 23, the third lens frame 24 and the differential ring 26 constitute a distance changing mechanism for the distance-varying lens group L23.

The differential spring 27 is a torsion spring 27 consisting of a loop portion 27a with its center substantially on the optical axis O and a pair of engaging radial projections 27b which project radially outwards from the opposite ends of the loop portion 27a, respectively. The loop portion 27a is fitted in the differential linking ring 25 to be engaged with an inner peripheral surface thereof by friction. The differential linking ring 25 is provided with a pair of radial through holes 25c into which the pair of engaging radial projections 27b are inserted from the inside of the differential linking ring 25 to project radially outwards from an outer peripheral surface of the differential linking ring 25. The differential linking ring 25 is provided on an inner peripheral surface thereof with an inward projection 25d (see FIG. 11) which is engaged with the loop portion 27a of the differential spring 27 to prevent the differential spring 27 from coming off the differential linking ring 25. The differential ring 26 is provided with a rotation transfer projection 26b which projects rearwards, and the pair of engaging radial projections 27b of the differential spring 27 are in pressing in contact with opposite surfaces of the rotation transfer projection 26b in a circumferential direction of the differential ring 26 in opposite directions towards each other. The differential linking ring 25 normally rotates together with the differential ring 26 via the differential spring 27 when the differential ring 26 rotates. However, if the differential linking ring 25 reaches one end of the range of rotation thereof (i.e., if a resistance which is generated in the differential linking ring 25 to rotate is greater than a predetermined resistance) when the differential ring 26 rotates, the differential ring 26 rotates relative to the differential linking ring 25 while the differential spring 27 is deformed to open the pair of engaging radial projections 27*b* (i.e., to move the pair of engaging radial projections 27*b* in opposite directions away from each other in a circumferential direction of the differential spring 27).

The second/third lens group support unit 20 is provided with a switching leaf (switching member) 28 which is provided on an inner peripheral surface thereof with a rotation transfer groove 28*a* which extends parallel to the optical axis O, while the rotation transfer projection 26*b* is provided with a linking pin 26*c* which projects radially outwards to be engaged in the rotation transfer groove 28*a*. As shown in FIG. 9, the switching leaf 28 is positioned in a guide slot 18*d* formed on the first linear guide ring 18, and is supported by the first linear guide ring 18 to be movable in a circumferential direction of the first linear guide ring 18 with respect to the first linear guide ring 18 within a predetermined angle of rotation about the optical axis O. The switching ring 16 is provided on an inner peripheral surface thereof with a switching groove (switching-member moving groove) 16*c*, while the switching leaf 28 is provided, on an outer peripheral surface thereof in the vicinity of the front end of the switching leaf 28, with a follower projection 28*b* which is engaged in the switching groove 16*c*. The switching ring 16, the switching groove 16*c*, and the follower projection 28*b* of the switching leaf 28 constitute a switching leaf moving mechanism (switching member moving mechanism).

Figure 18A:
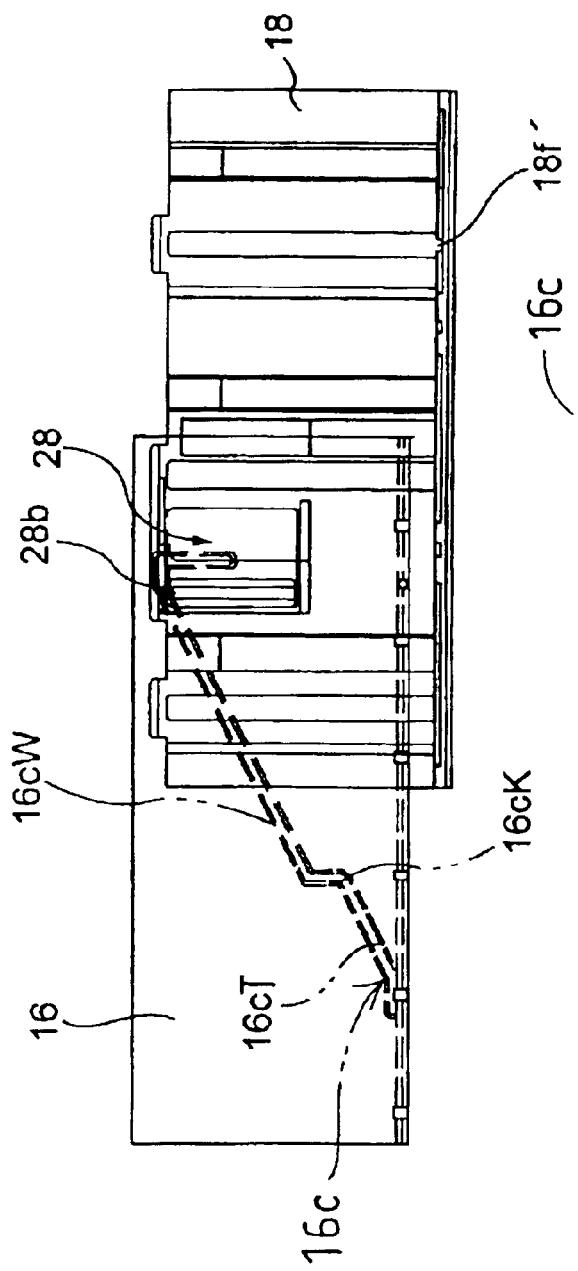
Figure 18B:
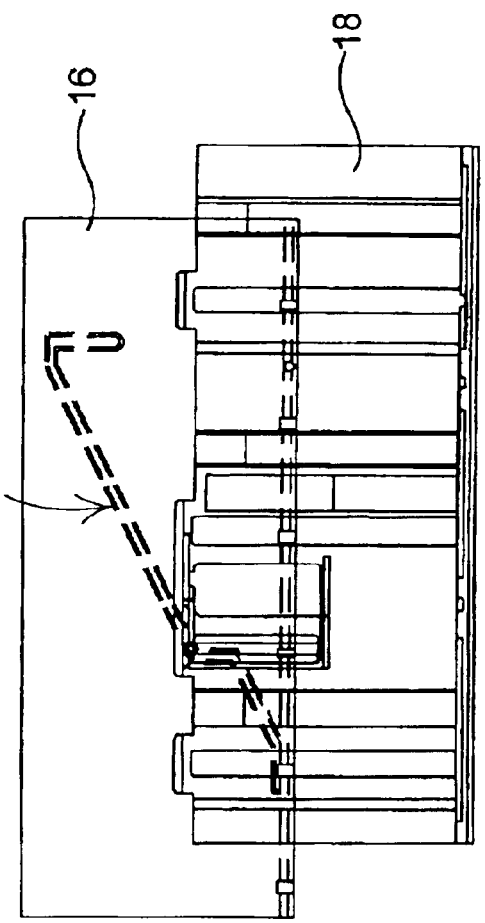

As shown in FIGS. 7 and 18A, the switching groove 16*c* consists of a telephoto section (first inclined section) 16*c*T, a switching section 16*c*K and a wide-angle section (switching section) 16*c*W, in that order from rear to front of the switching groove 16*c* (i.e., from bottom to top as viewed in FIG. 7). Each of the telephoto section 16*c*T and the wide-angle section (second inclined section) 16*c*W is inclined with respect to both a circumferential direction of the switching ring 16 and the optical axis direction. The lead angle of each of the telephoto section 16*c*T and the wide-angle section 16*c*W is the same as that of the threads of the female helicoid 15*c* of the cam ring 15, and the direction of inclination of each of the telephoto section 16*c*T and the wide-angle section 16*c*W is opposite to that of the threads of the female helicoid 15*c* of the cam ring 15. The switching section 16*c*K extends parallel to the optical axis O. Therefore, when the cam ring 15 and the switching ring 16 rotate together, the switching leaf 28 does not rotate relative to the first linear guide ring 18 as long as the follower projection 28*b* of the switching leaf 28 remains engaged in either the telephoto section 16*c*T or the wide-angle section 16*c*W. This keeps the distance between the second lens group L2 and the third lens group L3 at either a wide distance in the wide-angle range or a narrow distance in the telephoto range (see FIG. 1). However, in the case where the follower projection 28*b* of the switching leaf 28 is engaged in the switching section 16*c*K, the switching leaf 28 rotates relative to the first linear guide ring 18 when the cam ring 15 and the switching ring 16 rotate together. This rotation of the switching leaf 28 relative to the first linear guide ring 18 varies the distance between the narrow distance and the wide distance.

Figure 14:
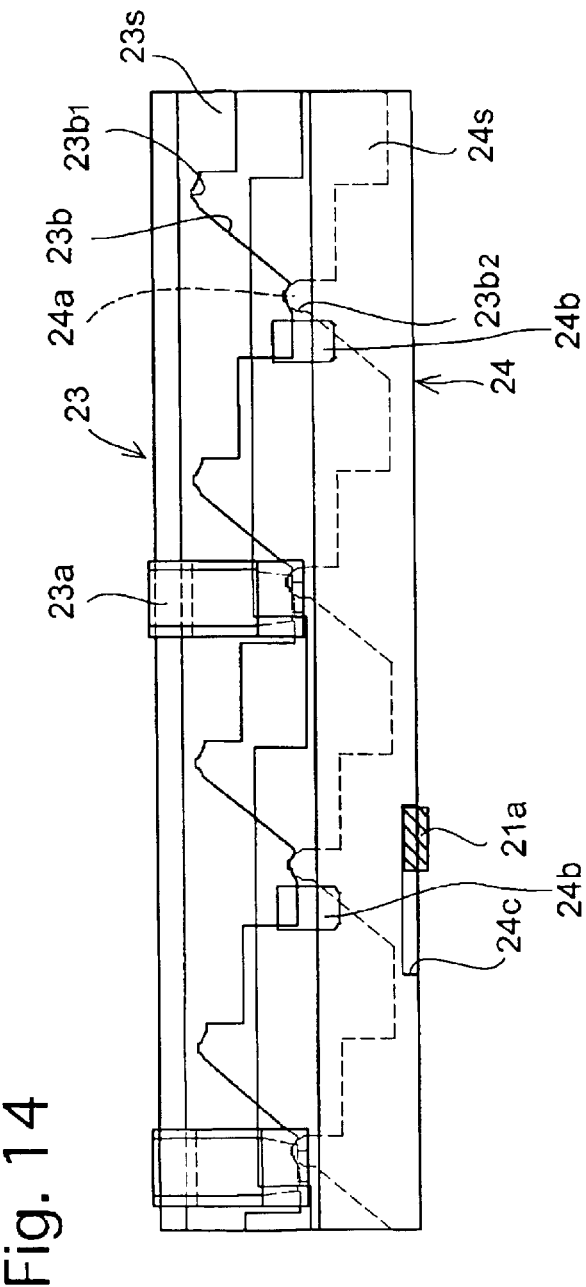
FIG. 14 is a developed view of the second/third lens group support unit in a wide-angle mode.
Figure 15:
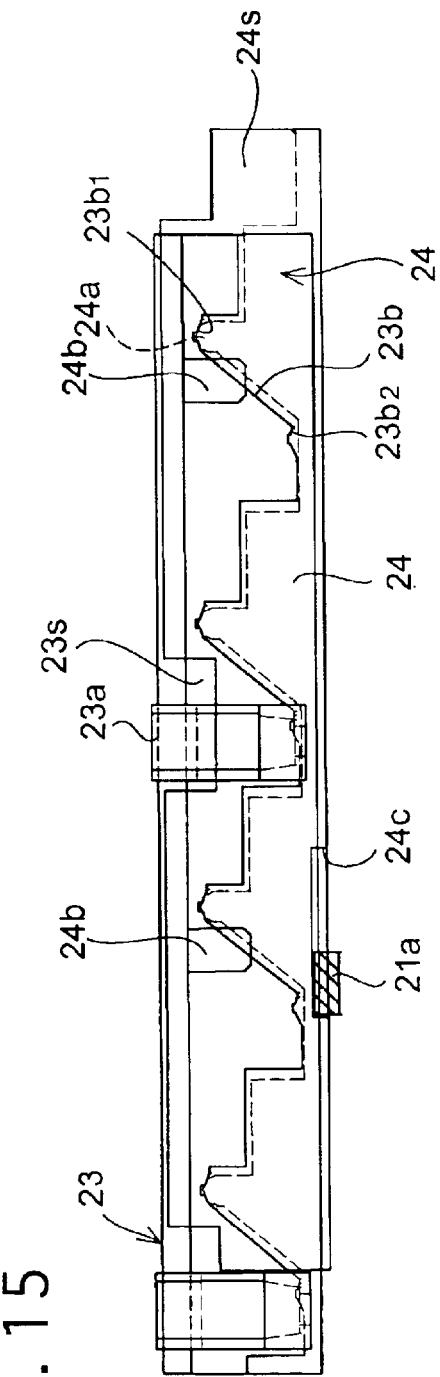
FIG. 15 is a developed view of the second/third lens group support unit in a telephoto mode.

As shown in FIGS. 14 and 15, the third lens frame 24 is provided with a rotational range limit groove 24*c* and the second/third lens group moving ring 21 is provided with a stop projection 21*a* which is engaged in the rotational range limit groove 24*c* to limit the range of rotation (rotational angle) of the third lens frame 24 relative to the second/third lens group moving ring 21 to a sufficient range for the third lens frame 24 to be switched between the wide-angle position and the telephoto position. The range of rotation (rotational angle) of a combination of the switching leaf 28 and the differential ring 26 is determined to be greater than that of the third lens frame 24, and the difference therebetween is absorbed by the differential spring 27.

Figure 16:
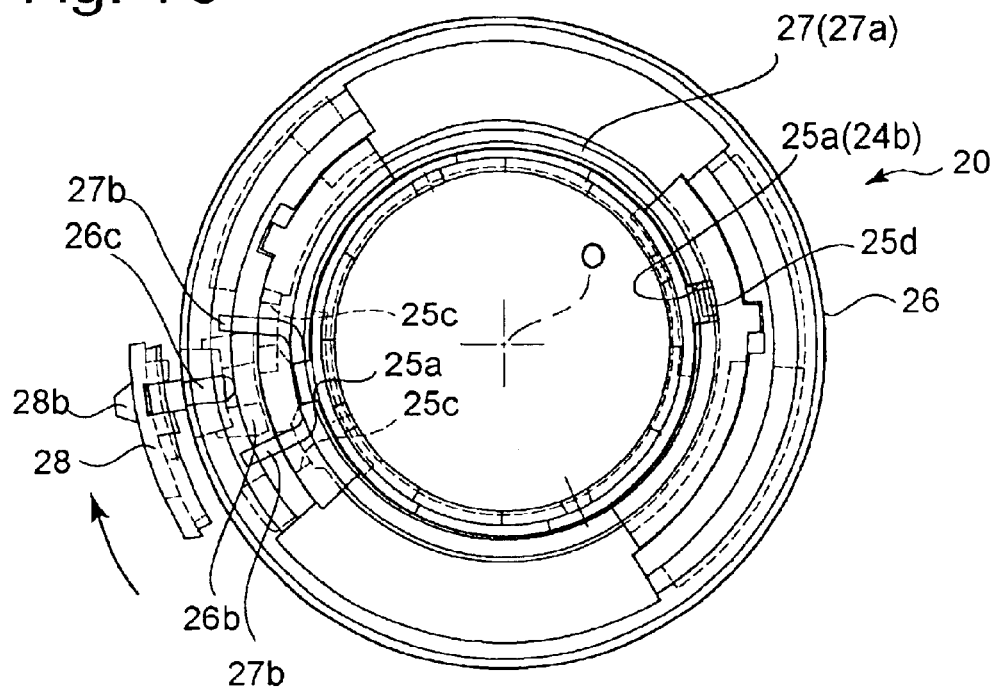
FIG. 16 is a front elevational view of the second/third lens group support unit in a state shown in FIG. 14.
Figure 17:
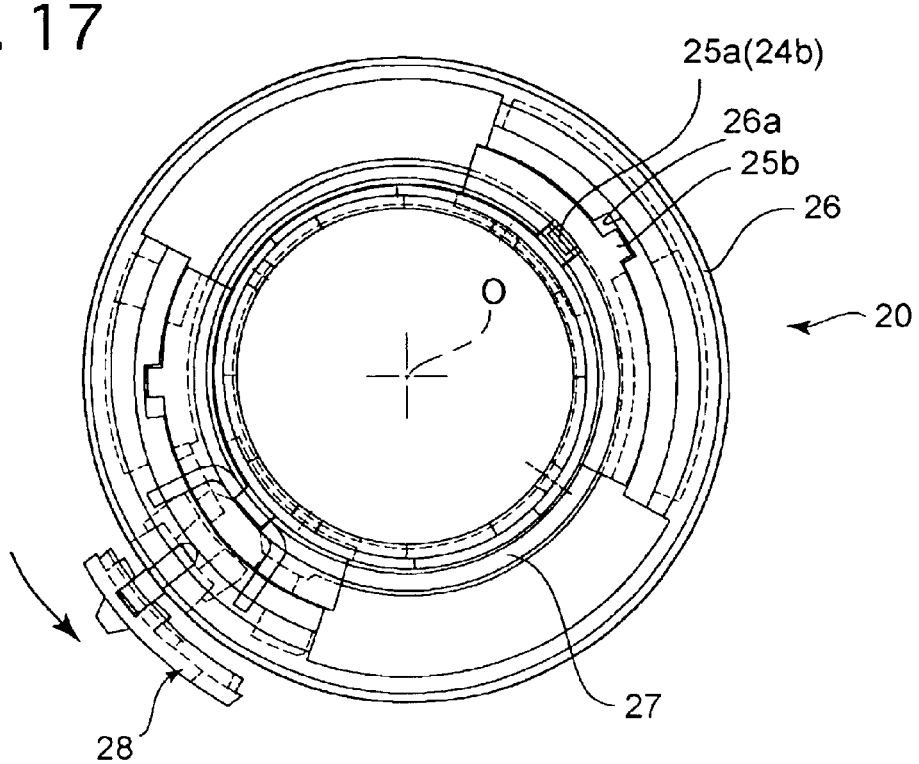
FIG. 17 is a front elevational view of the second/third lens group support unit in a state shown in FIG. 15.

If the switching leaf 28 is rotated counterclockwise from the position shown in FIG. 16 to the position shown in FIG. 17, via the engagement of the follower projection 28*b* with the switching groove 16*c* in a state shown in FIG. 14 where the second lens frame 23 (the second lens group L2) and the third lens frame 24 (the third lens group L3) are sufficiently apart from each other in the optical axis direction, the differential ring 26 rotates. This rotation of the differential ring 26 is transferred to the differential linking ring 25 via the engagement of the pair of engaging radial projections 27*b* of the differential spring 27 with the rotation transfer projection 26*b* to rotate the third lens frame 24 in the same rotational direction as the differential ring 26. This rotation of the third lens frame 24 causes one end of the rotational range limit groove 24*c* (the left end as viewed in FIGS. 14 and 15) to come into contact with the stop projection 21*a* to thereby prevent the differential linking ring 25, which rotates together with the third lens frame 24, from further rotating together with the third lens frame 24. Even after the differential linking ring 25 is prevented from rotating, the differential ring 26 continues to rotate in the same rotational direction. This overtravel of the differential ring 26 is absorbed by a resilient deformation of the differential spring 27. At the same time, the rotation of the third lens frame 24 causes the second lens frame 23, which is biased rearward by the pair of compression coil springs 22*b*, to move rearward due to the engagement of the set of four cam followers 24*a* with the set of four inclined cam edges 23*b*, thus causing the second lens group L2 and the third lens group L3 to approach each other (see FIGS. 15 and 17). The pair of forced-rotation transfer projections 25*b* are tightly engaged with the pair of forced-rotation transfer grooves 26*a*, respectively, to forcefully transfer rotation of the differential ring 26 to the differential linking ring 25 in the event of the pair of engaging radial projections 27*b* of the differential spring 27 being open due to a resistance in the differential linking ring 25 from rotating caused by some reason.

If the switching leaf 28 is rotated reversely, i.e., clockwise from the position shown in FIG. 17 to the position shown in FIG. 16, via the engagement of the follower projection 28*b* with the switching groove 16*c* in a state shown in FIG. 15 where the second lens frame 23 (the second lens group L2) and the third lens frame 24 (the third lens group L3) are positioned closely to each other in the optical axis direction, the second lens frame 23 (the second lens group L2) and the third lens frame 24 (the third lens group L3) move apart from each other in the optical axis direction in the reverse manner to the above described manner. The operations of the differential ring 25, the differential linking ring 26 and the differential spring 27 are the same as those described above when the switching leaf 28 is rotated counterclockwise as viewed in FIG. 16. Each inclined cam edge 23*b* of the second lens frame 23 is provided on opposite ends thereof with a front recess 23*b*1 and a rear recess 23*b*2 for holding the associated cam follower 24*a* at a telephoto mode position and a wide-angle mode position with stability, respectively. The four inclined cam edges 23b each having such structure are arranged at equi-angular intervals in a circumferential direction of the second lens frame 23 (i.e., a circumferential direction of the third lens frame 24) to ensure precision in spacing (i.e., the distance) between the second lens group L2 and the third lens group L3 and the precision in positioning the second lens group L2 and the third lens group L3 concentrically with the optical axis O.

The zoom lens barrel 10 is provided immediately behind the second/third lens group moving ring 21 with a shutter unit 32 which is fixed to the second/third lens group moving ring 21 by set screws (see FIG. 2). A flexible printed wiring board (flexible PWB) 33 for electrically connecting the shutter unit 32 to a control circuit of the camera body (not shown) extends from the shutter unit 32. The zoom lens barrel 10 is provided between an inner peripheral surface of the first lens frame 17 in the vicinity of the front end thereof and a front surface of the second/third lens group support unit 20 with a light shield bellows 34.

Operations of the zoom lens barrel 10 to achieve focus will be hereinafter discussed with reference mainly to FIG. 19. In the present embodiment of the zoom lens barrel, the set of three bottomed cam grooves 15d are also used to achieve focus, i.e., a focusing operation is performed with a rotation of the cam ring 15. The step-zoom lens barrel 10 has a variable focal length of six different focal lengths: four different focal lengths (steps 1, 2, 3 and 4) in the wide-angle mode and two different focal lengths (steps 5 and 6) in the telephoto mode. The contours of the set of three bottomed cam grooves 15d are determined so as to move the second/third lens group support unit 20 (the second lens group L2 and the third lens group L3) between a closest photographing position (N) and an infinite photographing position (∞) in the optical axis direction at each of the six different focal lengths. Specifically, each cam groove 15d includes a step-1 position for the infinite photographing position (∞), a step-1 position for the closest photographing position (N), a step-2 position for the closest photographing position (N), a step-2 position for the infinite photographing position (∞), a step-3 position for the infinite photographing position (∞), a step-3 position for the closest photographing position (N), a step-4 position for the closest photographing position (N), a step-4 position for the infinite photographing position (∞), the mode switching section, a step-5 position for the infinite photographing position (∞), a step-5 position for the closest photographing position (N), a step-6 position for the closest photographing position (N), and a step-6 position for the infinite photographing position (∞), in that order in a rotating direction of the cam ring 15. The angle of rotation (the angular position of the cam ring 15) of the cam ring 15 is controlled in accordance with information on a set focal length and an object distance.

As shown in FIG. 19, each cam groove 15d is formed so that the closest photographing positions (N) in two adjacent focal-length step positions are adjacent to each other, and the infinite photographing positions (∞) in two adjacent focal-length step positions are adjacent to each other (with the exception of the adjacent steps 4 (∞) and 5 (∞). This structure is advantageous to simplify the contour of each cam groove 15d and to shorten the length thereof.

The above described embodiment of the zoom lens barrel includes: the first linear guide ring 18 which is supported to be linearly movable along the optical axis O without rotating; the lens group support ring (moving frame) 17 which is supported by the first linear guide ring 18 to be linearly movable along the optical axis O without rotating and is provided on an outer peripheral surface of the lens group support ring 17 with the male helicoid 17a; a cam ring (rotatable ring) 15 which is coupled to the first linear guide ring 18 at a predetermined relative rotational position between the cam ring 15 and the first linear guide ring 18 to be freely rotatable relative to the first linear guide ring 18 without moving along the optical axis O relative to the first linear guide ring 18 and is provided on an inner peripheral surface of the cam ring 15 with the female helicoid 15c which is engaged with the male helicoid 17a of the lens group support ring 17; the switching ring 16 that is coupled to the cam ring 15 to be freely movable along the optical axis O relative to the cam ring 15 and rotatable together with the cam ring 15 and is coupled to the lens group support ring 17 at a predetermined relative rotational position between the switching ring 16 and the lens group support ring 17 to be freely rotatable relative to the lens group support ring 17 without moving along the optical axis O relative to the lens group support ring 17; the switching leaf 28 which is supported by the first linear guide ring 18 to be freely movable in a circumferential direction of the first linear guide ring 18 within a predetermined range of movement without moving along the optical axis O relative to the first linear guide ring 18; and the switching groove (switching-member moving groove) 16c which is formed on an inner peripheral surface of the switching ring 16 to be engaged with the follower projection 28b projecting from the switching leaf 28. The switching groove 16c which is formed as a bottomed groove includes the telephoto section (first inclined section) 16cT, the switching section 16cK, a wide-angle section (second inclined section) 16cW and an assembling section 16cA, in that order from rear to front of the zoom lens barrel 10. The telephoto section 16cT is shaped so that the lead angle thereof is the same as that of the threads of the female helicoid 15c of the cam ring 15 and so that the direction of inclination of the telephoto section 16cT is opposite to that of the threads of the female helicoid 15c of the cam ring 15. The switching section 16cK is shaped to extend parallel to the optical axis O from the front end of the telephoto section 16cT. The wide-angle section 16cW is shaped to extend parallel to the telephoto section 16cT from the front end of the switching section 16cK. The assembling section 16cA extends rearwards from the front end of the wide-angle section 16cW to be parallel to the optical axis O (see FIG. 7).

The assembling groove 16cA serves to make the first linear guide ring 18 and the cam ring 15 coupled in a bayonet manner, to make the lens group support ring 17 and the switching ring 16 coupled in a bayonet manner, and to make the lens group support ring 17 and the cam ring 15 coupled in a helicoid manner. FIGS. 20 through 43 show assembling procedures of the zoom lens barrel 10.

Figure 20:
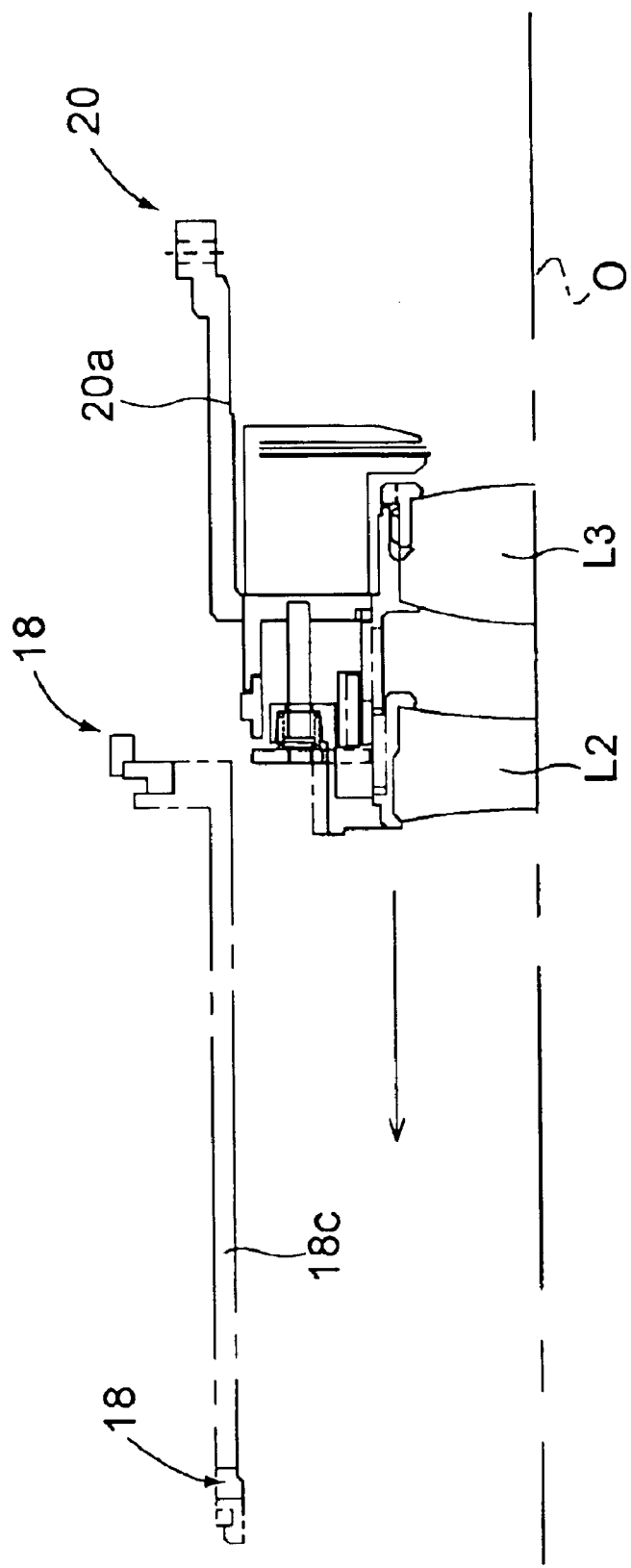
FIG. 20 is a longitudinal cross sectional view of a portion of the zoom lens barrel shown in FIG. 2, showing a state of the second/third lens group support unit before it is fitted into the first linear guide ring from the image side, showing only an upper half of the portion of the zoom lens barrel from the optical axis.
Figure 21:
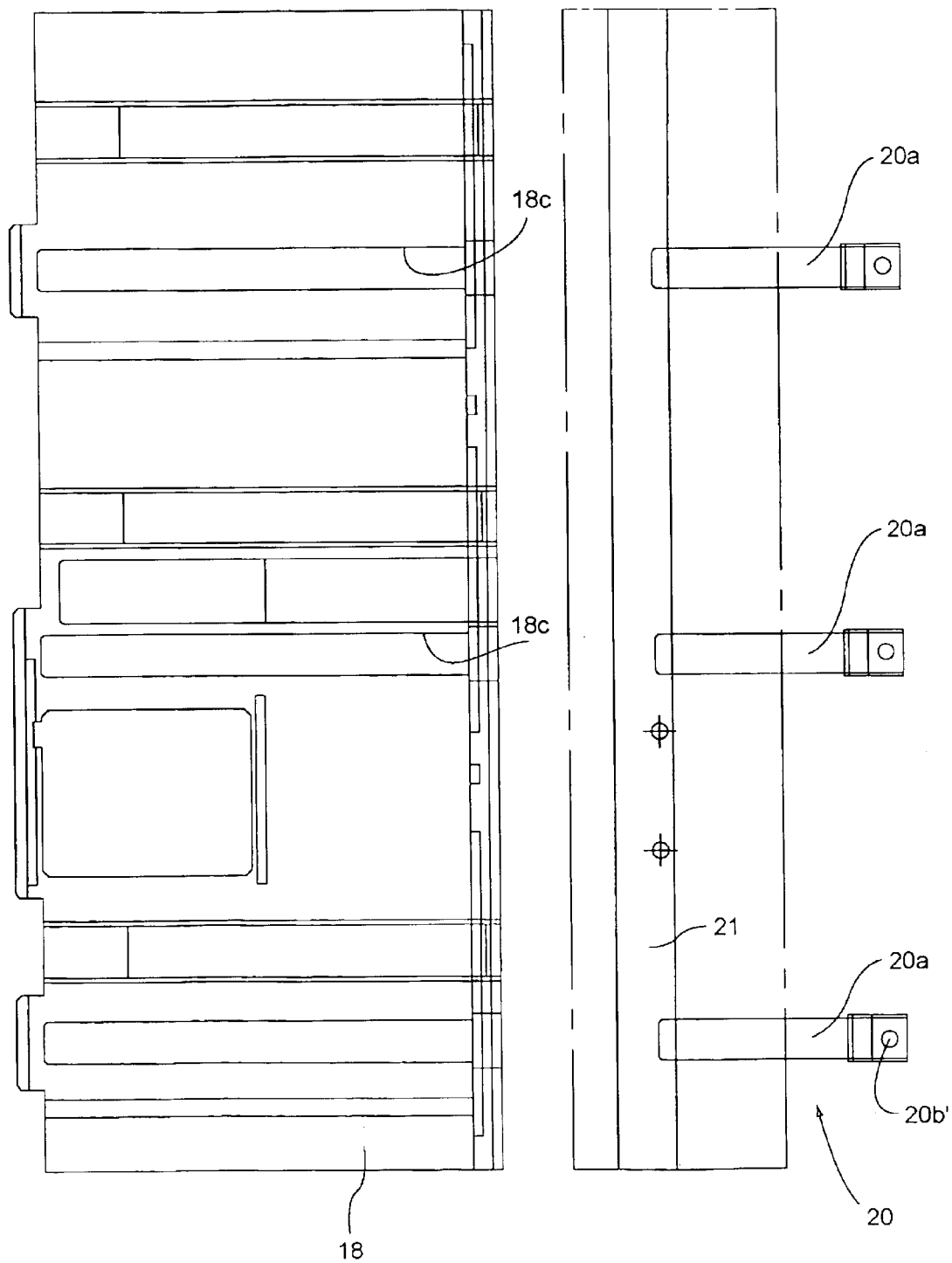
FIG. 21 is a schematic developed view of the assembly shown in FIG. 20.
Figure 22:
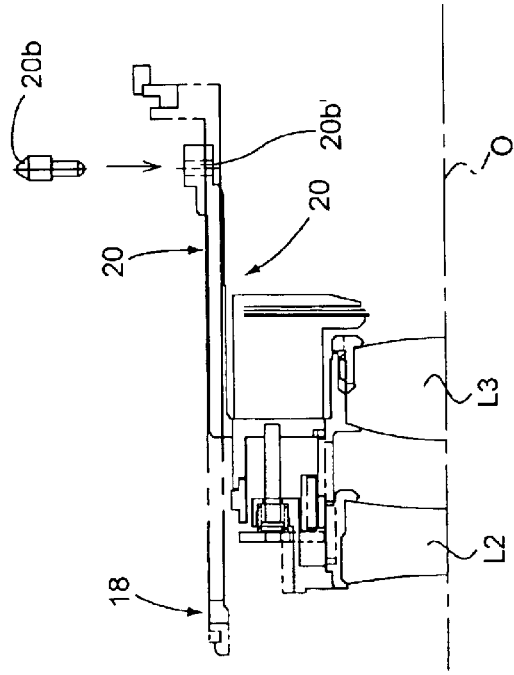
FIG. 22 is a longitudinal cross sectional view of a portion of the zoom lens barrel shown in FIG. 2, showing a state of the second/third lens group support unit after it has been fitted into the first linear guide ring, showing only an upper half of the portion of the zoom lens barrel from the optical axis.

FIG. 20 is a longitudinal cross sectional view of a portion of the zoom lens barrel 10, showing a state of the second/third lens group support unit 20 before being fitted into the first linear guide ring 18 from the image side, showing only an upper half of the portion of the zoom lens barrel 10 from the optical axis O, while FIG. 21 is a developed view of the first linear guide ring 18 and the second/third lens group support unit 20. From the state shown in FIGS. 20 and 21, the set of three guide arms 20a of the second/third lens group support unit 20 are inserted into the set of three linear guide slots 18c of the first linear guide ring 18 to be freely slidable therein, respectively. FIG. 22 is a longitudinal cross sectional view of a portion of the zoom lens barrel 10, showing a state of the second/third lens group support unit 20 after being fitted into the first linear guide ring 18, showing only an upper half of the portion of the zoom lens barrel from the optical axis O. Three fixing holes 20b' are formed on the set of three guide arms 20a in the vicinity of the rear ends thereof, respectively. In the state shown in FIG. 22, the three fixing holes 20b' are exposed radially outwards through the set of three linear guide slots 18c, respectively. From the state shown in FIG. 22, the set of three cam followers 20b are snugly fitted into three fixing holes 20b' through the set of three linear guide slots 18c in radial directions to be fixed to the set of three guide arms 20a, respectively. Engaging the set of three cam followers 20b into the set of three guide arms 20a in such a manner prevents the second/third lens group support unit 20 from coming off the first linear guide ring 18.

Figure 23:
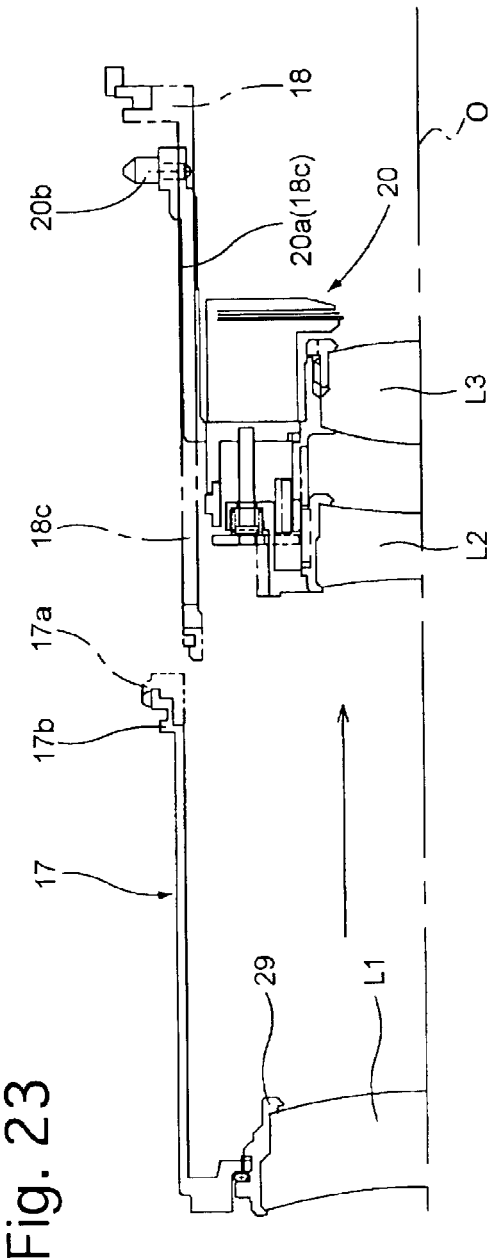
FIG. 23 is a longitudinal cross sectional view of a portion of the zoom lens barrel shown in FIG. 2, showing a state of the assembly shown in FIG. 22 before it is fitted into the first lens group support ring from the object side, showing only an upper half of the portion of the zoom lens barrel from the optical axis.
Figure 24:
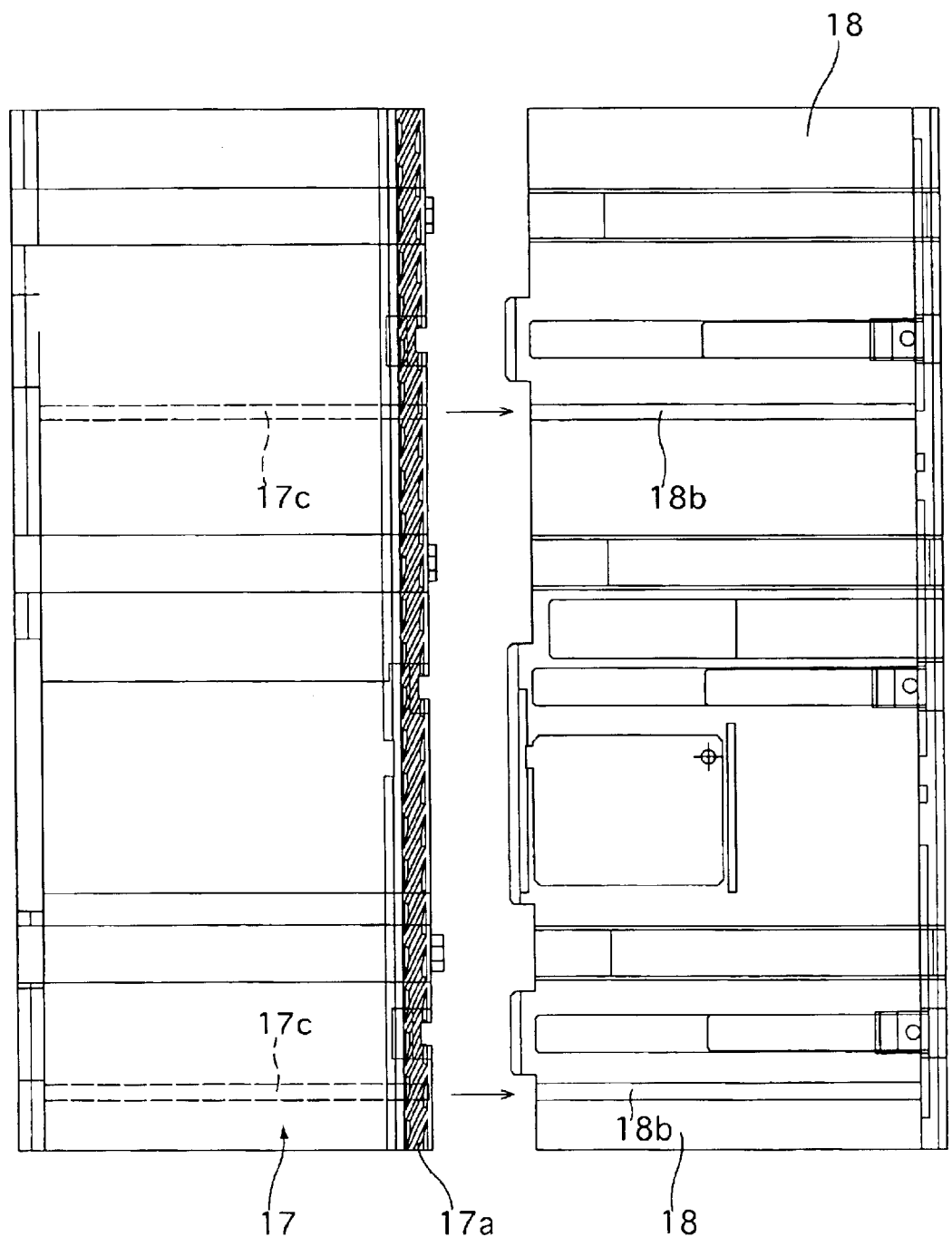
FIG. 24 is a schematic developed view of the assembly shown in FIG. 23.
Figure 25:
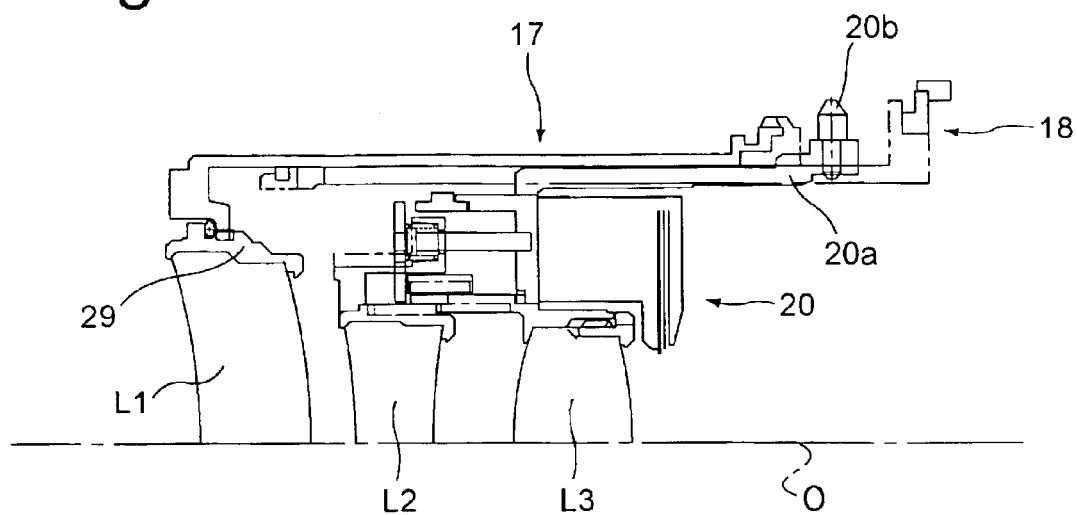
FIG. 25 is a longitudinal cross sectional view of a portion of the zoom lens barrel shown in FIG. 2, showing an assembled state of the portion of the zoom lens barrel shown in FIG. 23 after it has been fitted into the first lens group support ring, showing only an upper half of the portion of the zoom lens barrel from the optical axis.
Figure 26:
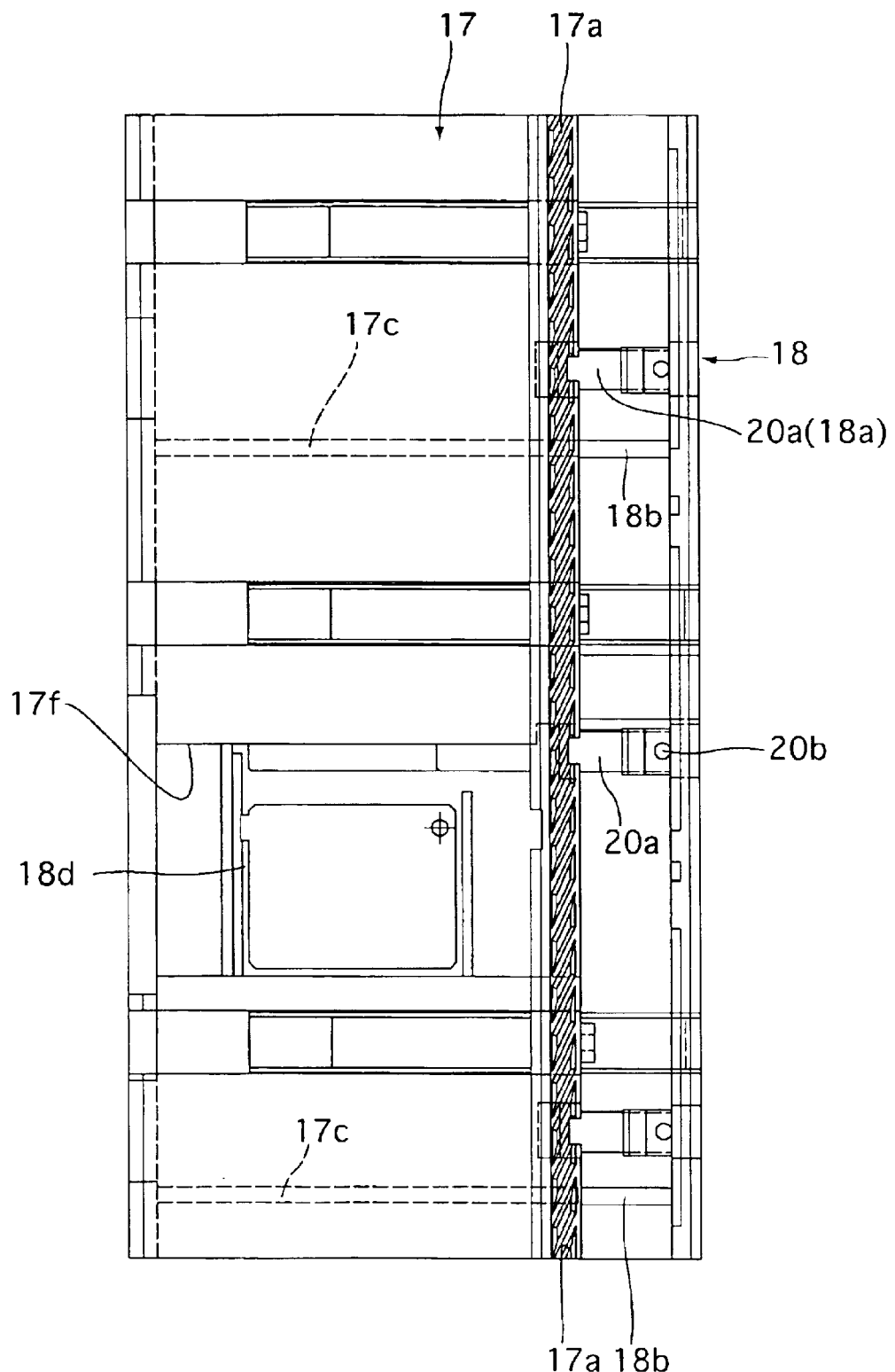
FIG. 26 is a developed view of the assembly shown in FIG. 25.

FIG. 23 shows the portion of the zoom lens barrel shown in FIG. 22 before being fitted into the first lens group support ring 17 from the object side. FIG. 24 is a schematic developed view of the assembly shown in FIG. 23. From this state shown in FIGS. 23 and 24, the linear guide projection 17c of the lens group support ring 17 is inserted into the linear guide groove 18b of the first linear guide ring 18 to be freely slidable therein. FIG. 25 is a longitudinal cross sectional view of a portion of the zoom lens barrel shown in FIG. 2, showing an assembled state of the portion of the zoom lens barrel shown in FIG. 23 after being fitted into the first lens group support ring 17. FIG. 26 is a developed view of the assembly shown in FIG. 25. In the state shown in FIGS. 25 and 26, the guide slot 18d of the first linear guide ring 18 is exposed radially outwards through a through opening 17f which is formed on the lens group support ring 17 (see FIG. 26).

Figure 27:
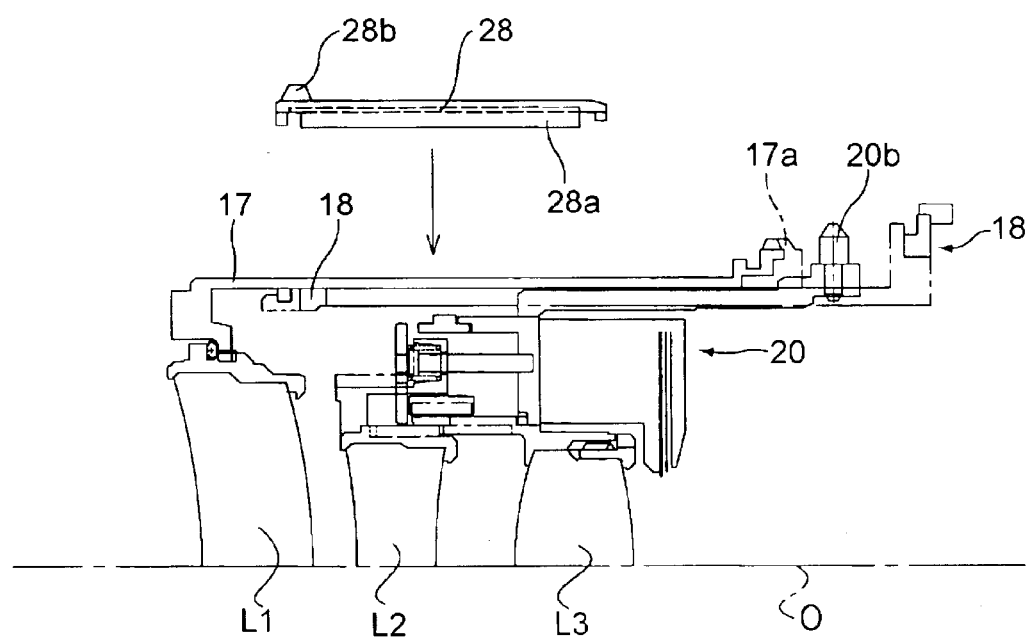
FIG. 27 is a longitudinal cross sectional view of the assembly shown in FIG. 25 from the optical axis and the switching leaf of the second/third lens group support unit, showing a manner of mounting the switching leaf to the assembly shown in FIG. 25 in a radial direction thereof.

FIG. 27 shows a manner of mounting the switching leaf 28 to the assembly shown in FIG. 25 to be positioned in the guide slot 18d through the through opening 17f. From the state shown in FIG. 27, the linking pin 26c which projects radially outwards from the rotation transfer projection 26b is made to be engaged in the rotation transfer groove 28a of the switching leaf 28 (see FIGS. 12 and 31).

Figure 28:
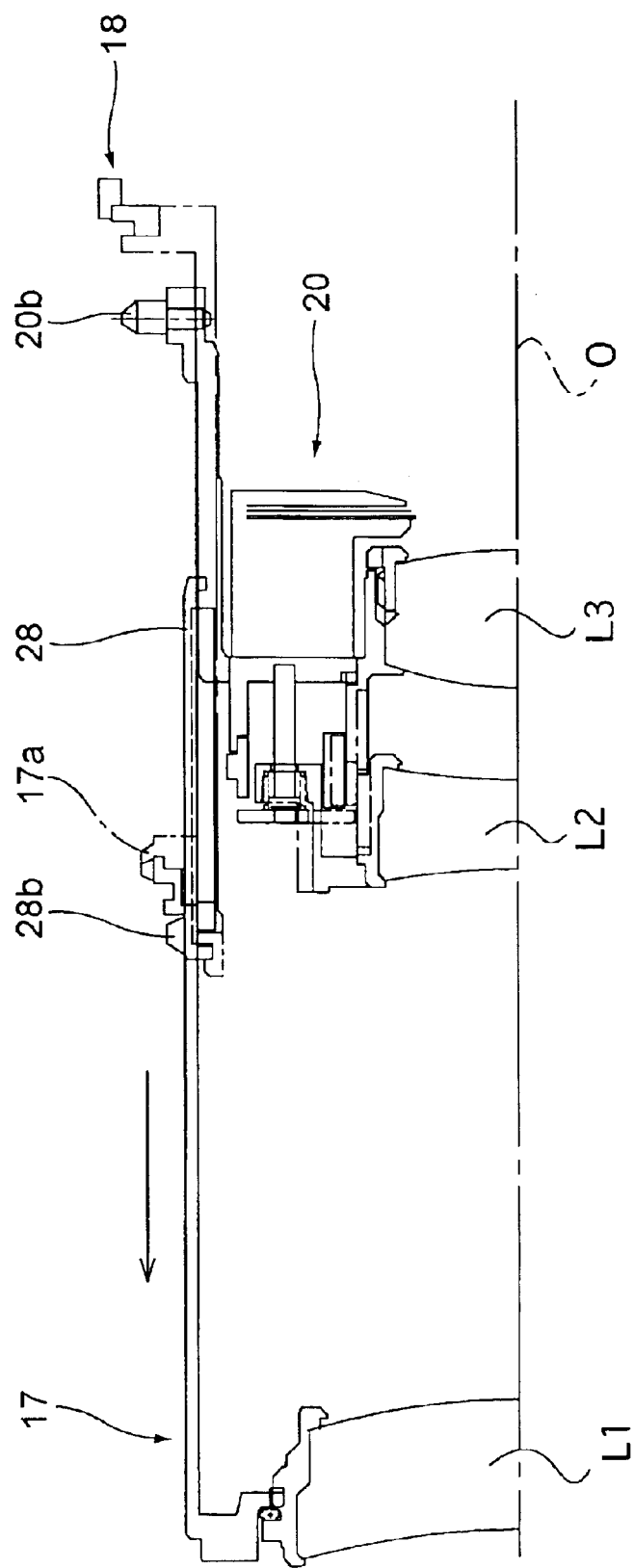
FIG. 28 is a longitudinal cross sectional view of the assembly shown in FIG. 25 after the switching leaf has been mounted thereto, showing a state where the first lens group support ring is drawn from the assembly shown in FIG. 27 along the optical axis to a predetermined position at which the switching ring is made to fit on the first lens group support ring.

After the switching leaf 28 has been mounted to the first linear guide ring 18 in the above described manner, the first lens group support ring 17 is drawn from the assembly shown in FIG. 27 along the optical axis O to a predetermined position shown in FIG. 28 to prepare for the switching ring 16 to be fitted on the first lens group support ring 17. From this state shown in FIG. 28, the switching ring 16 is fitted on the first lens group support ring 17 (see FIG. 29). Since the switching groove 16c (which includes the telephoto section 16cT, the switching section 16cK, the wide-angle section 16cW and the assembling section 16cA in that order from rear to front of the zoom lens barrel 10) is formed on an inner peripheral surface of the switching ring 16 and since the rear end of the telephoto section 16cT is open on a rear end surface of the switching ring 16, the follower projection 28b of the switching leaf 28 can be inserted into the switching groove 16c through the open rear end of the telephoto section 16cT (see FIGS. 30 and 31).

At the same time, the guide projection 17b of the first lens group support ring 17 is made to be engaged in the circumferential groove 16a of the switching ring 16. In this state where the guide projection 17b is engaged in the circumferential groove 16a, if the switching ring 16 and the first lens group support ring 17 are rotated relative to each other by a predetermined amount of movement, the switching ring 16 and the first lens group support ring 17 are coupled in a bayonet manner to be freely rotatable relative to each other and to be movable together as an integral member along the optical axis O. In the state shown in FIG. 30, the switching ring 16 is positioned at the rearmost position relative to the first lens group support ring 17, and is therefore impossible to further move rearward relative to the first lens group support ring 17.

Figure 31:
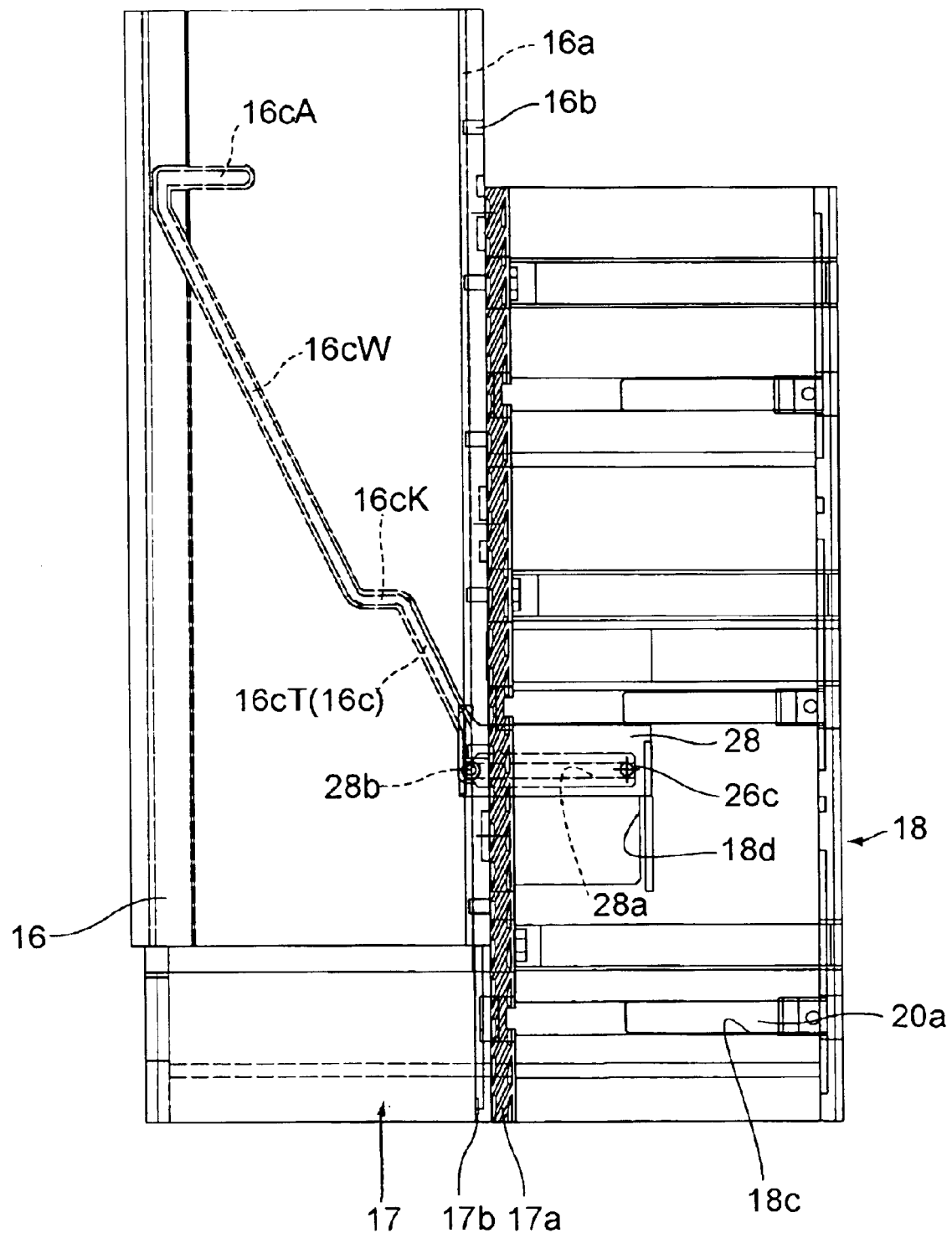
FIG. 31 is a developed view of the assembly shown in FIG. 30.
Figure 32:
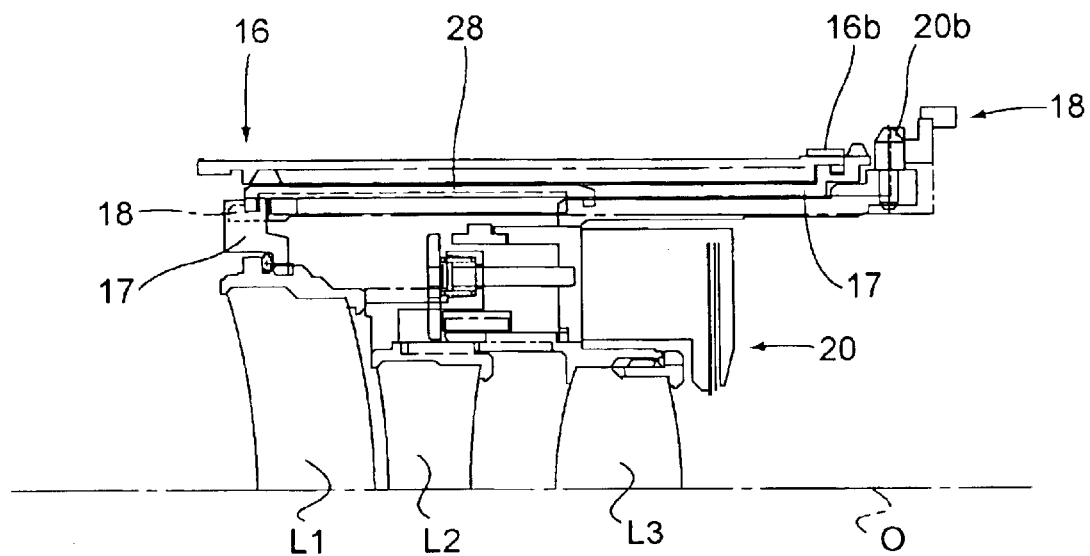
FIG. 32 is a view similar to that of FIG. 30, showing a state where the first lens group support ring on which the switching ring is fitted is fully fitted on the first linear guide ring while the switching ring is being rotated from the state shown in FIGS. 30 and 31.
Figure 33:
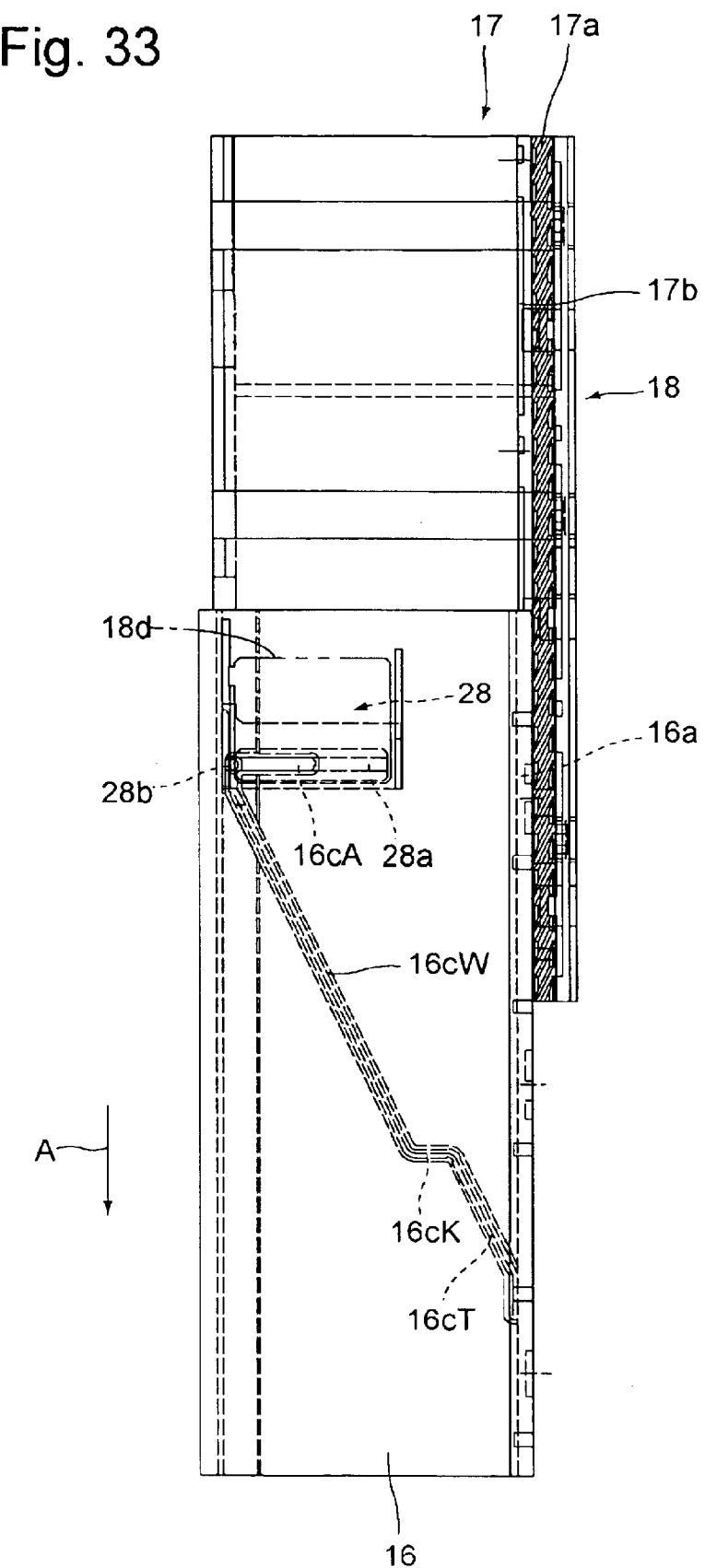
FIG. 33 is a developed view of the assembly shown in FIG. 32.

FIG. 32 is a view similar to that of FIG. 30, and shows a state where the first lens group support ring 17 (on which the switching ring 16 is fitted) is fitted on the first linear guide ring 18 and fully moved up to the rearmost position relative to the first linear guide ring 18, while the switching ring 16 is being rotated relative to the first lens group support-ring 17 clockwise as viewed from the object side (in a direction shown by an arrow A in FIG. 33) from the state shown in FIGS. 30 and 31. FIG. 33 is a developed view of the assembly shown in FIG. 32. In the state shown in FIGS. 32 and 33, the switching ring 16 and the first lens group support ring 17 are movable together along the optical axis O while the switching ring 16 is allowed to rotate freely about the optical axis O relative to the first lens group support ring 17.

Figure 34:
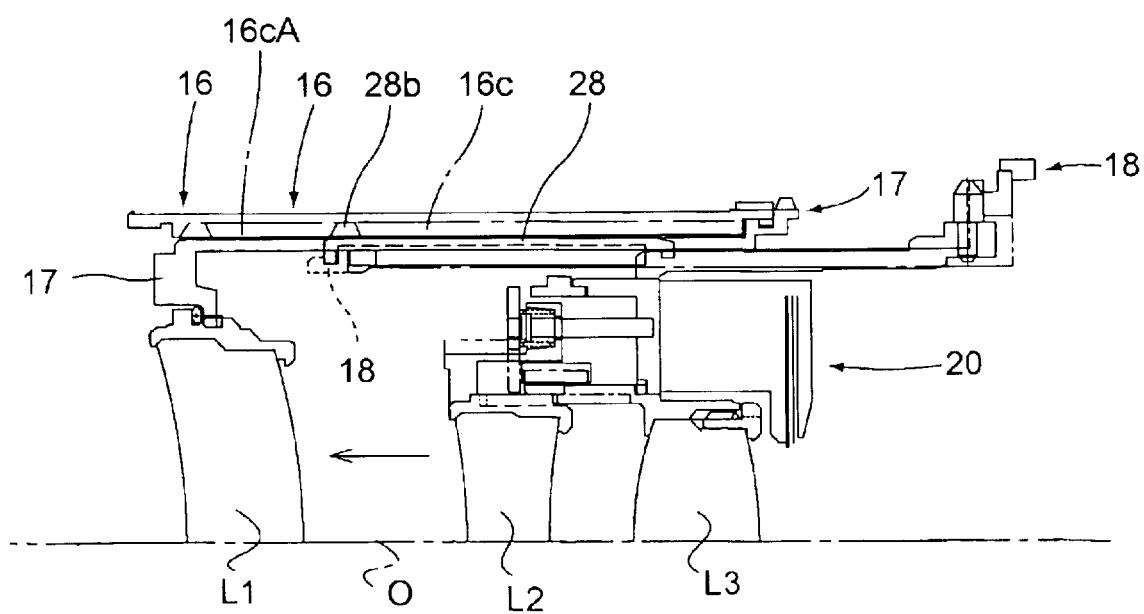
FIG. 34 is a view similar to that of FIG. 32, showing a state where a combination of the first lens group support ring and the switching ring is drawn from the first linear guide ring of the assembly shown in FIG. 32 in a direction toward the object side along the optical axis.
Figure 35:
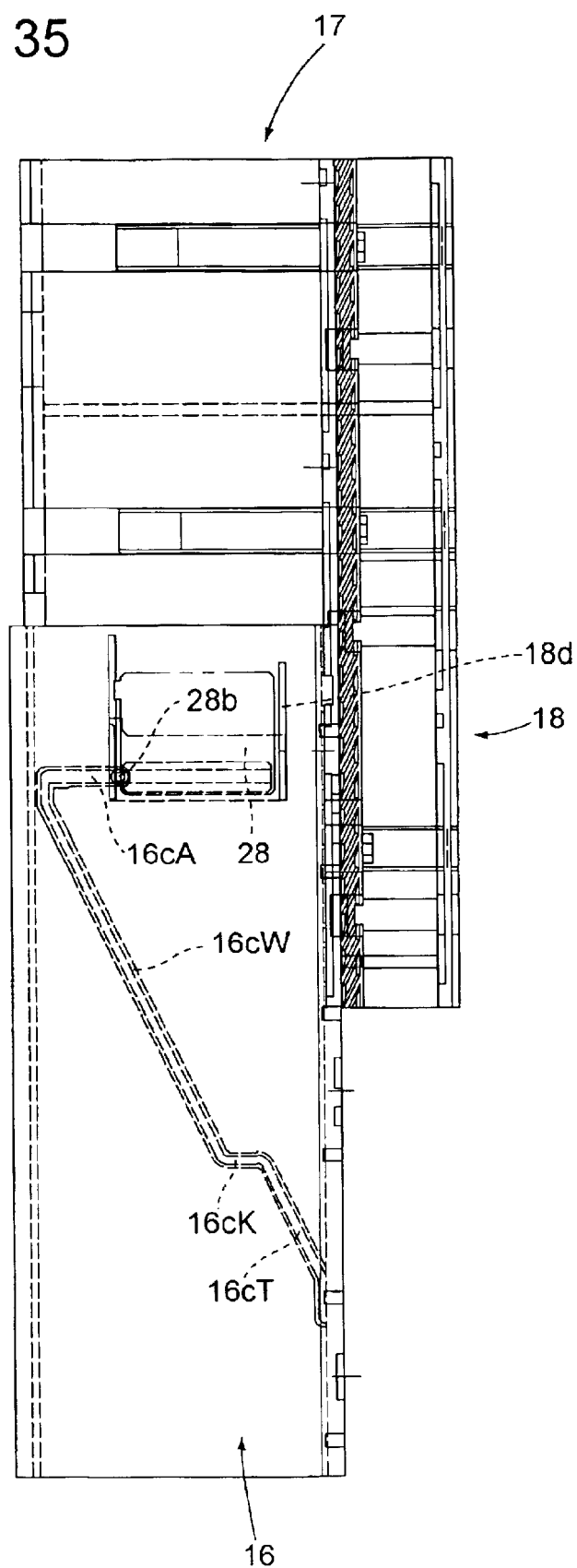
FIG. 35 is a developed view of the assembly shown in FIG. 34.

FIG. 34 is a view similar to that of FIG. 32, showing a state where a combination of the switching ring 16 and the first lens group support ring 17 is drawn from the first linear guide ring 18 of the assembly shown in FIG. 32 in a direction toward the object side along the optical axis O. FIG. 35 is a developed view of the assembly shown in FIG. 34. It is possible to draw the combination of the switching ring 16 and the first lens group support ring 17 from the first linear guide ring 18 of the assembly shown in FIG. 32 because the switching groove 16c is formed to include the assembling section 16cA. Namely, the follower projection 28b of the switching leaf 28 moves from the front end of the wide-angle section 16cW to the rear end of the assembling section 16cA. It should be noted that the switching leaf 28 is supported by the first linear guide ring 18 to be immovable in the guide slot 18d in the optical axis direction and to be movable in the guide slot 18d in a circumferential direction of the first linear guide ring 18 within a predetermined range of movement.

The combination of the switching ring 16 and the first lens group support ring 17 is drawn from the first linear guide ring 18 of the assembly shown in FIG. 32 in a manner described above so as to engage the female helicoid 15c of the cam ring 15 with the male helicoid 17a of the first lens group support ring 17 and further to couple the cam ring 15 to the first linear guide ring 18 in a bayonet manner so that the cam ring 15 is freely rotatable relative to the first linear guide ring 18 and movable together with the first linear guide ring 18 in the optical axis direction. Specifically, the circumferential groove 15f is formed on the cam ring 15 on an inner peripheral surface thereof in the vicinity of the rear end of the cam ring 15, while the outer flange 18f is formed on an outer peripheral surface of the first linear guide ring 18 in the vicinity of the rear end of the first linear guide ring 18. The outer flange 18f is provided with a plurality of cutout portions 18g at predetermined angular positions, while the cam ring 15 is provided immediately behind the circumferential groove 15f with a corresponding plurality of engaging lugs (bayonet lugs) 15g (see FIGS. 37, 41 and 43). The outer flange 18f can be engaged in the circumferential groove 15f if the cam ring 15 and the first linear guide ring 18 are moved relative to each other along the optical axis O in opposite directions to bring the circumferential groove 15f and the outer flange 18f close to each other with the plurality of engaging lugs (bayonet lugs) 15g and the plurality of cutout portions 18g aligned in the optical axis direction.

Figure 36:
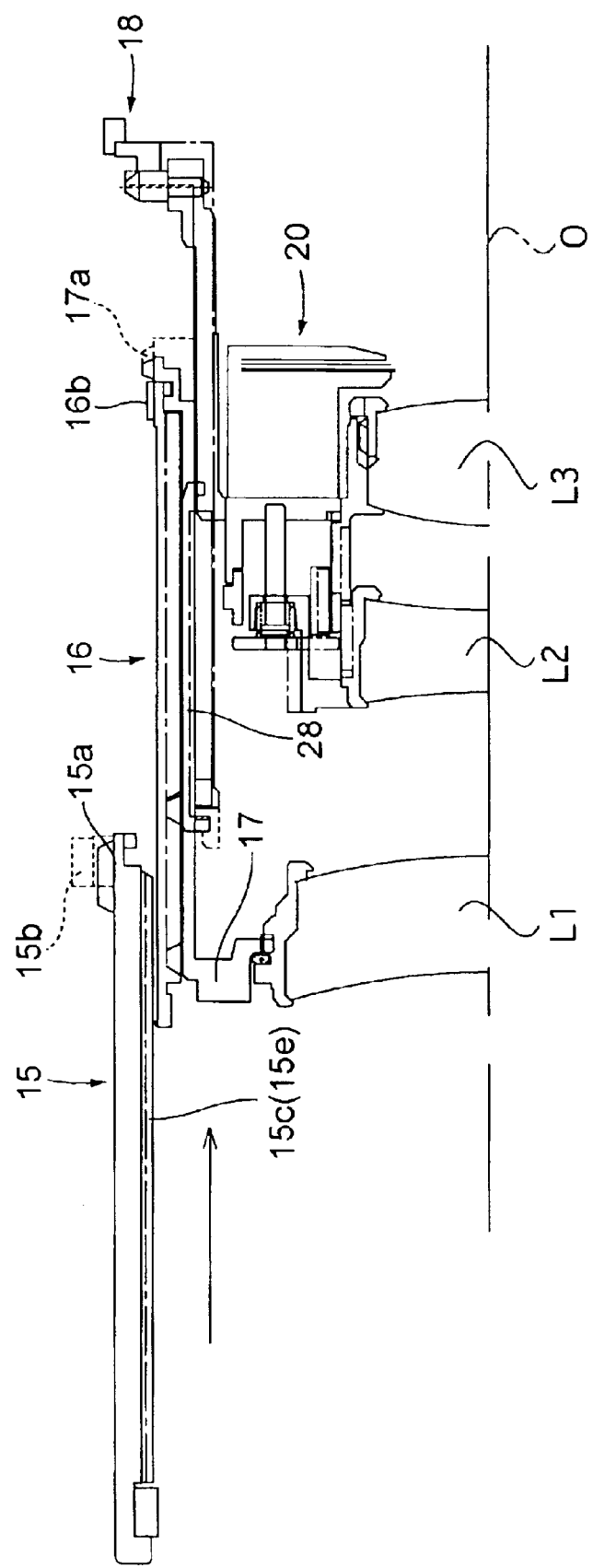
FIG. 36 is a longitudinal cross sectional view of the assembly shown in FIG. 34 and the cam ring, showing a manner of fitting the cam ring on the assembly shown in FIG. 34 from the object side.
Figure 37:
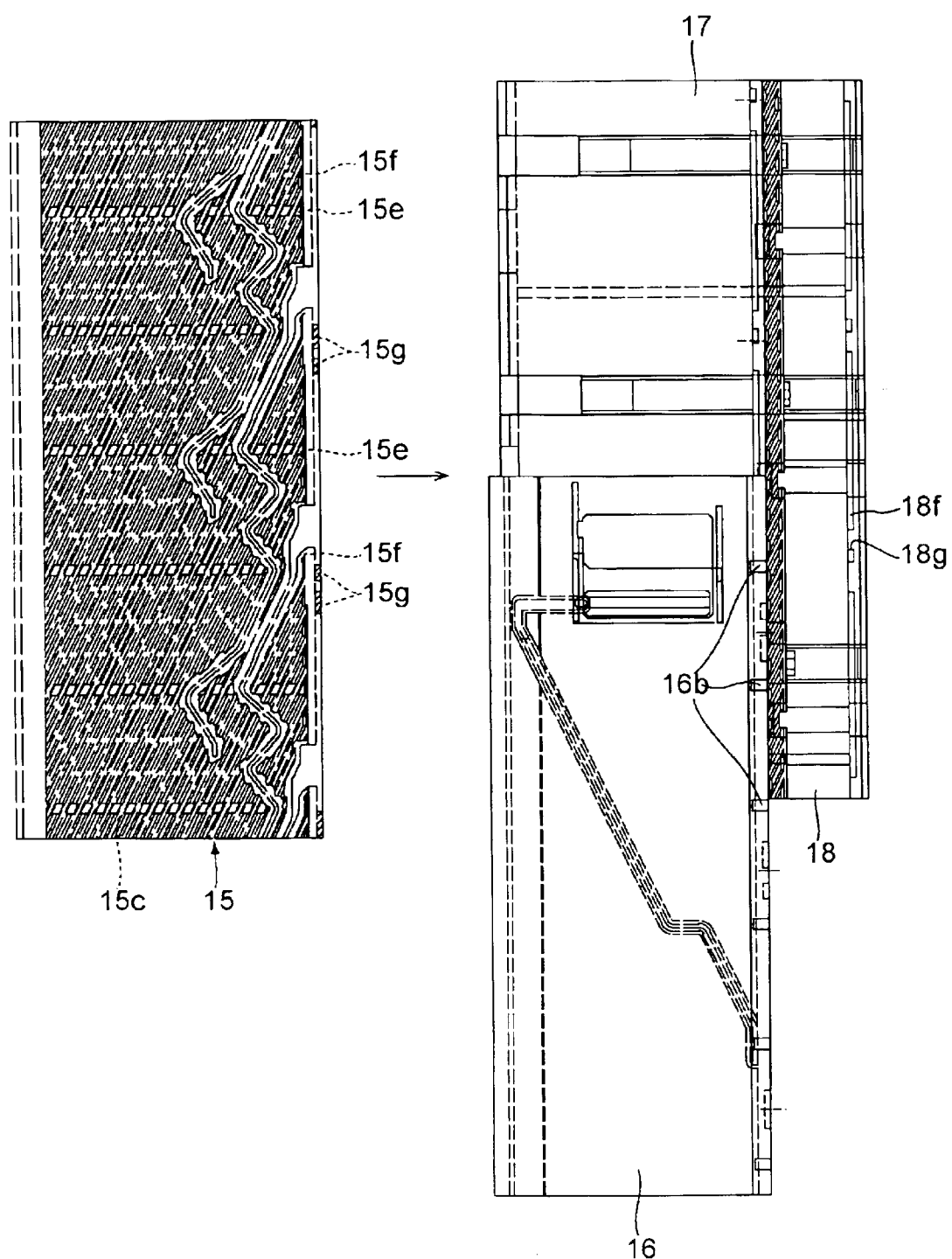
FIG. 37 is a developed view of the assembly shown in FIG. 36.

FIG. 36 is a longitudinal cross sectional view similar to that of FIG. 34, showing a manner of fitting the cam ring 15 on the assembly shown in FIG. 34 from the object side. FIG.

37 is a developed view of the assembly shown in FIG. 36. The female helicoid 15c, which is engaged with the male helicoid 17a of the first lens group support ring 17, and the set of six rotation transfer grooves 15e, in which the set of six rotation transfer projections 16b of the switching ring 16 are respectively engaged, are formed on an inner peripheral surface of the cam ring 15. The set of six rotation transfer projections 16b are positioned at equi-angular intervals on an outer peripheral surface of the switching ring 16 at the rear end thereof, while the set of six rotation transfer grooves 15e are formed to correspond to the set of six rotation transfer projections 16b by cutting out portions of the female helicoid 15c to correspond to the set of six rotation transfer projections 16b. In the state shown in FIGS. 36 and 37, the cam ring 15 and the switching ring 16 are positioned relative to each other so that the set of six rotation transfer projections 16b and the set of six rotation transfer grooves 15e are aligned in the optical axis direction. However, in the state shown in FIGS. 36 and 37, the plurality of engaging lugs (bayonet lugs) 15g and the plurality of cutout portions 18g are not aligned in the optical axis direction.

Figure 38:
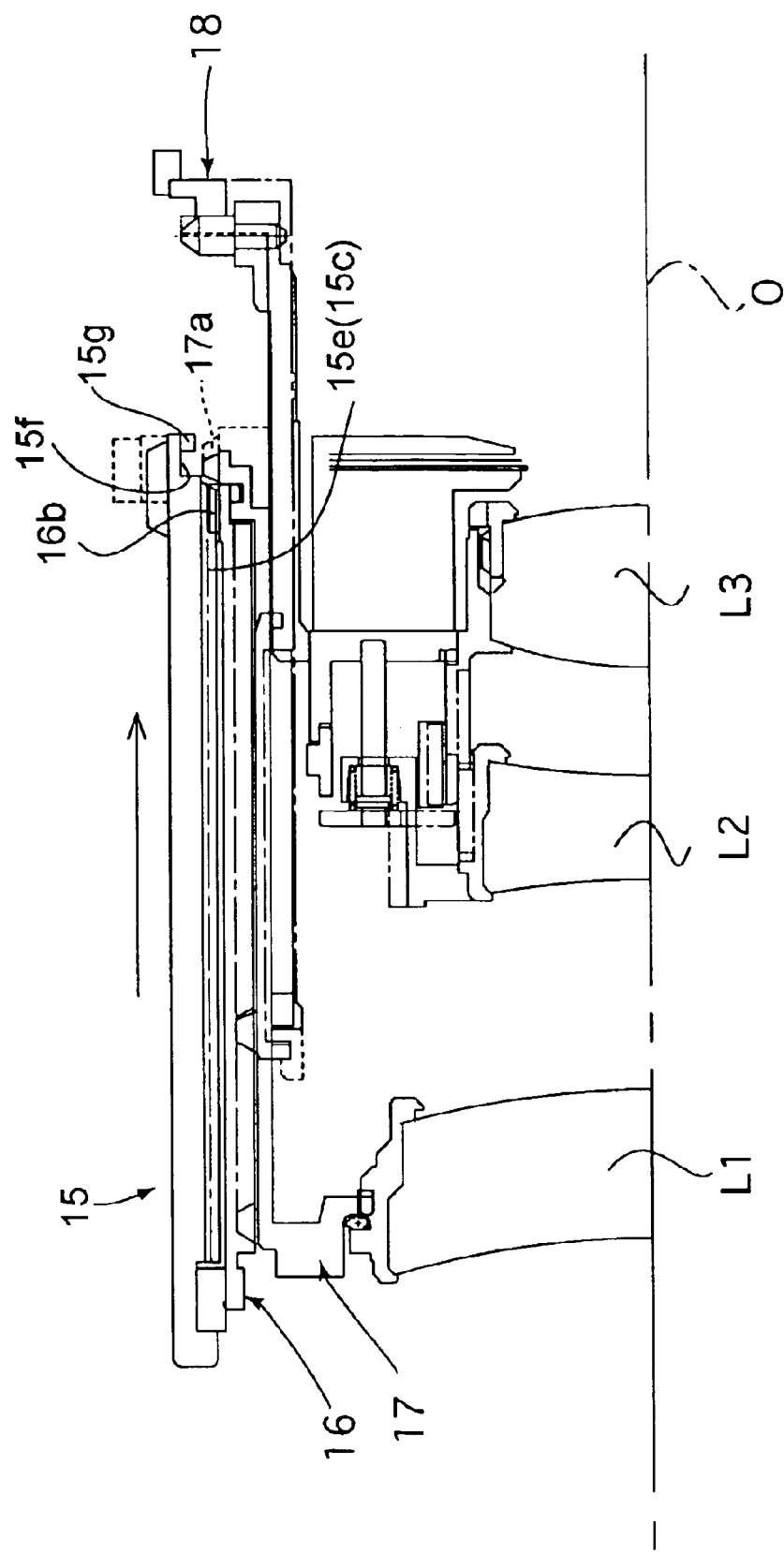
FIG. 38 is a view similar to that of FIG. 36, showing a state where the cam ring is fitted on the switching ring of the assembly shown in FIG. 36 from the object side.
Figure 39:
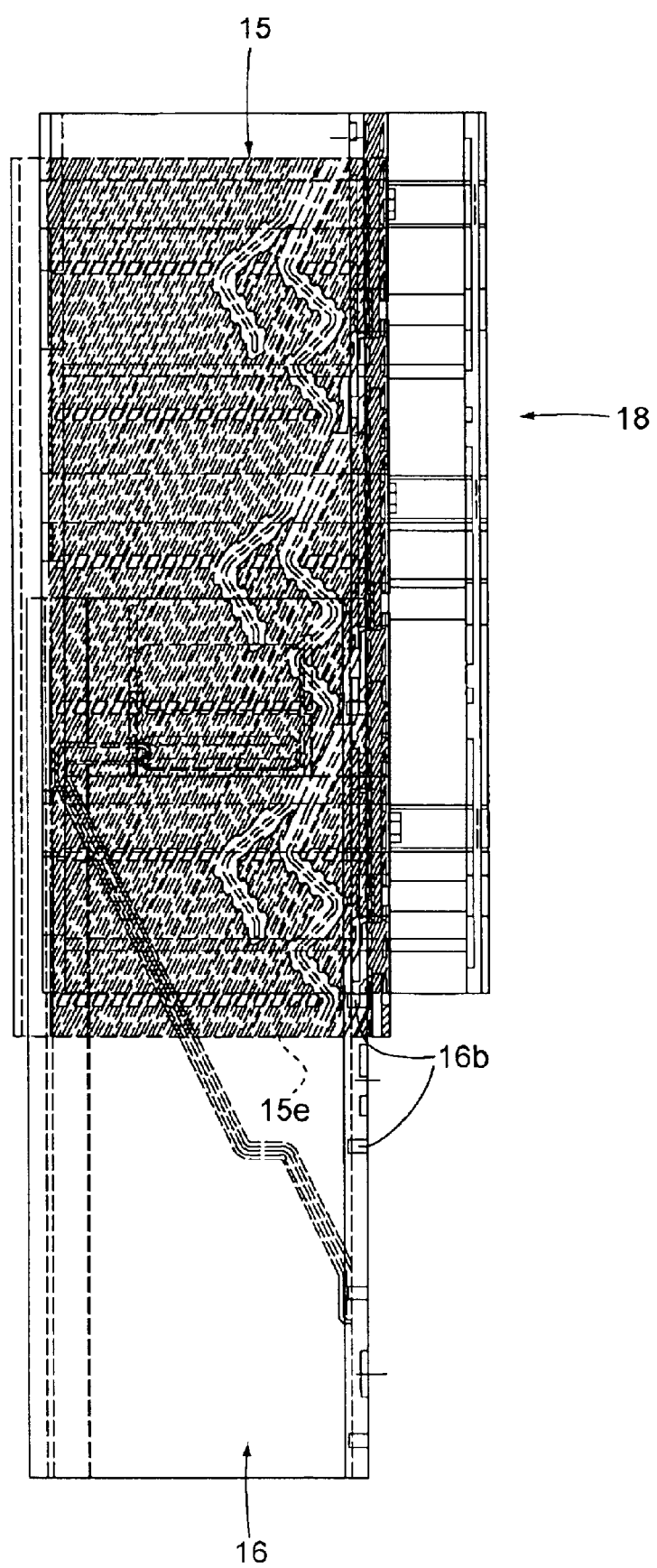
FIG. 39 is a developed view of the assembly shown in FIG. 38.

FIG. 38 is a view similar to that of FIG. 36, showing a state where the cam ring 15 is fitted on the switching ring 16 of the assembly of FIG. 36 from the object side so that the set of six rotation transfer projections 16b of the switching ring 16 are respectively engaged with the set of rotation transfer grooves 15e of the cam ring 15. FIG. 39 is a developed view of the assembly shown in FIG. 38. In the state shown in FIGS. 38 and 39, in which the set of six rotation transfer projections 16b are respectively engaged with the set of rotation transfer grooves 15e, the switching ring 16 rotates synchronously with the cam ring 15 whenever rotating.

Figure 40:
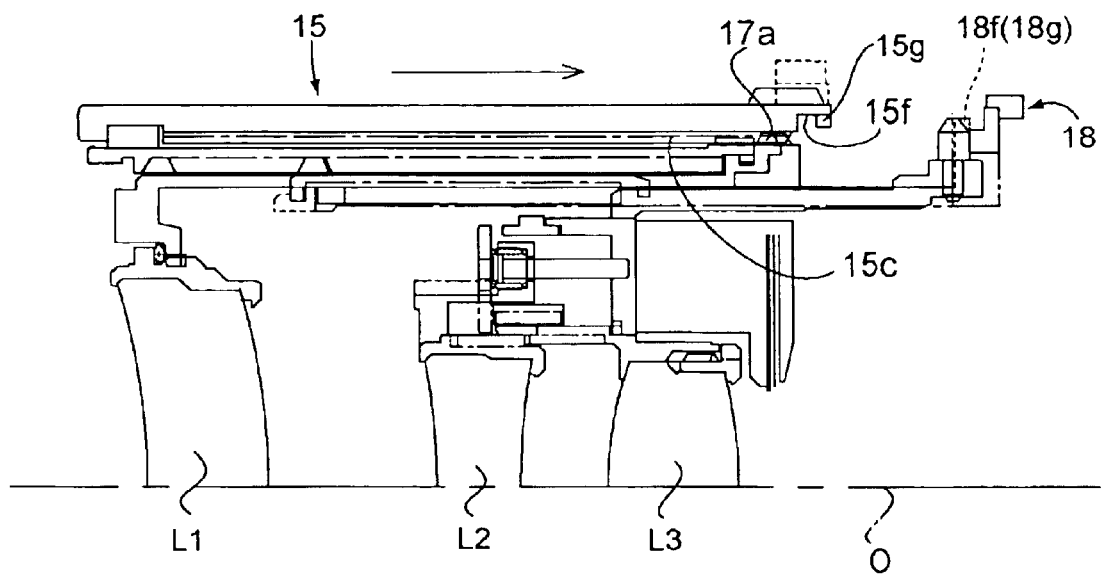
FIG. 40 is a view similar to that of FIG. 38, showing a state where the male helicoid of the first lens group support ring is engaged with the female helicoid of the cam ring by rotating the cam ring relative to the first lens group support ring.
Figure 41:
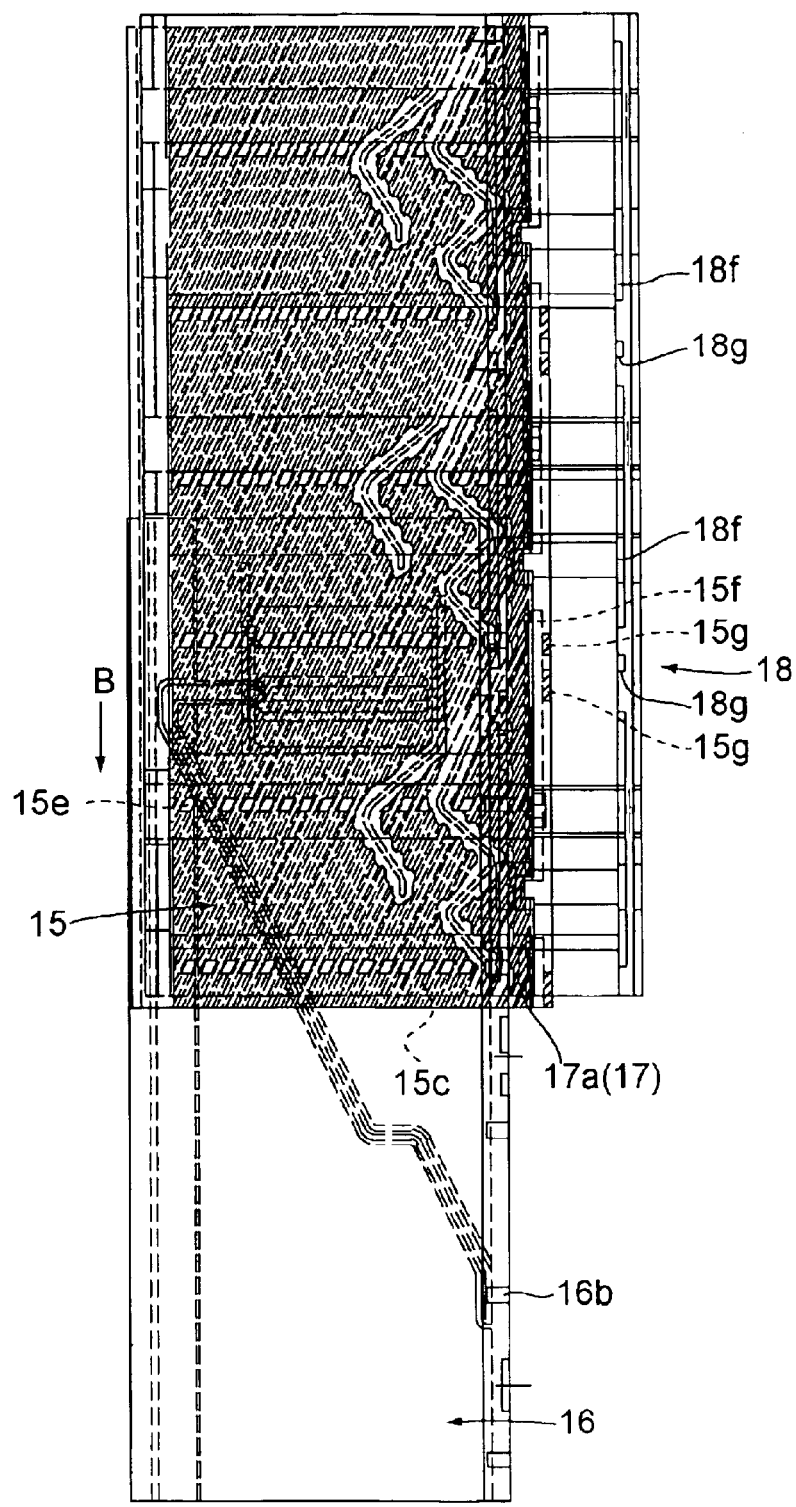
FIG. 41 is a developed view of the assembly shown in FIG. 40.

FIG. 40 is a view similar to that of FIG. 38, showing a state where the male helicoid 17a of the first lens group support ring 17 is engaged with the female helicoid 15c of the cam ring 15 by rotating the cam ring 15 relative to the first lens group support ring 17 clockwise as viewed from the object side (in a direction shown by an arrow B in FIG. 41) from the state shown in FIGS. 38 and 39. FIG. 41 is a developed view of the assembly shown in FIG. 40. Such an engagement of the male helicoid 17a with the female helicoid 15c is possible because the combination of the switching ring 16 and the first lens group support ring 17 has been drawn from the first linear guide ring 18 as shown in FIG. 38. At this time, if the combination of the switching ring 16 and the first lens group support ring 17 is not drawn from the first linear guide ring 18, the plurality of engaging lugs (bayonet lugs) 15g of the cam ring 15 interfere with the outer flange 18f to prevent the male helicoid 17a and the female helicoid 15c from engaging with each other.

Figure 42:
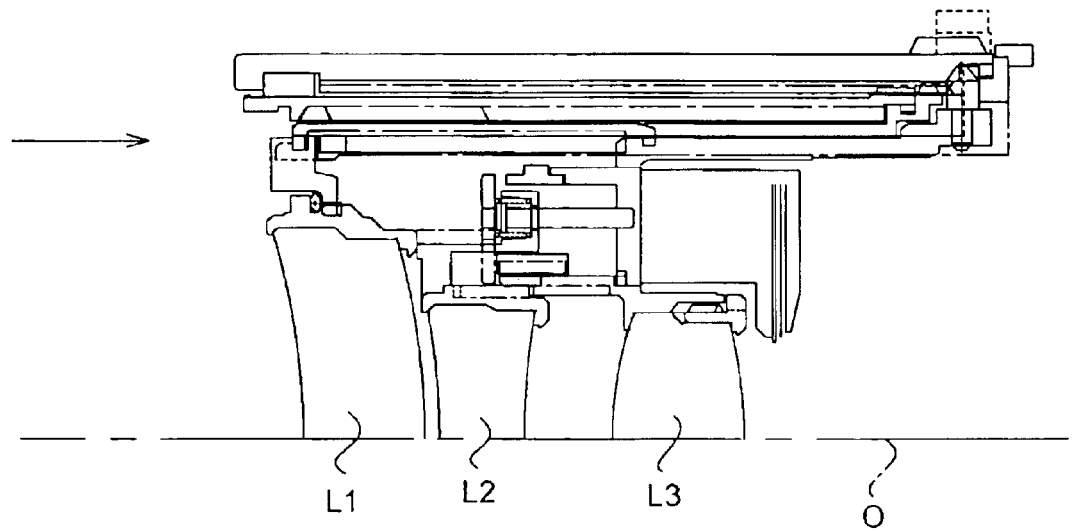
FIG. 42 is a view similar to that of FIG. 40, showing a completely assembled state of the assembly shown in FIG. 40.
Figure 43:
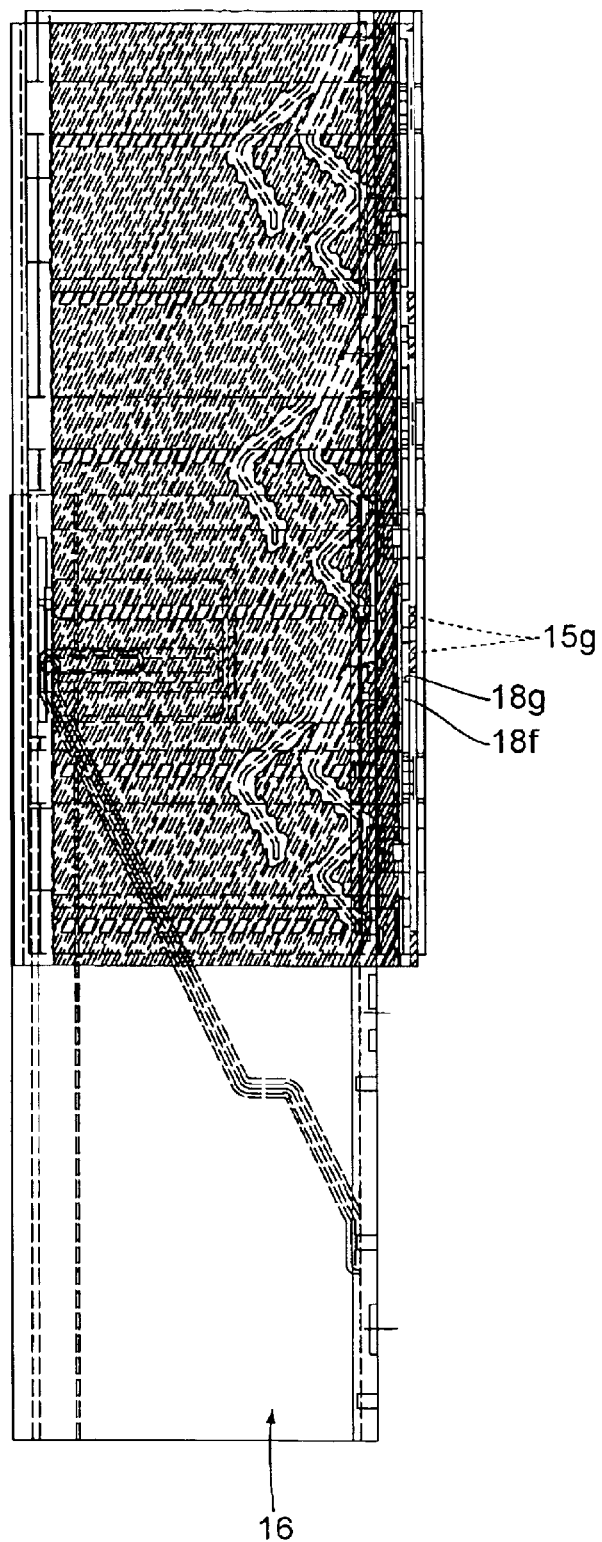
FIG. 43 is a developed view of the assembly shown in FIG. 42.

Subsequently, the cam ring 15 and the first linear guide ring 18 are rotated relative to each other with the female helicoid 15c being engaged with the male helicoid 17a so that the plurality of engaging lugs (bayonet lugs) 15g and the plurality of cutout portions 18g are aligned in the optical axis direction. Subsequently, in this state where the plurality of engaging lugs 15g and the plurality of cutout portions 18g are aligned in the optical axis direction, the outer flange 18f can engage in the circumferential groove 15f by moving the cam ring 15 and the first linear guide ring 18 relative to each other along the optical axis O. FIGS. 42 and 43 show a state where the assembly shown in FIG. 40 is in a completely assembled state.

Figure 44:
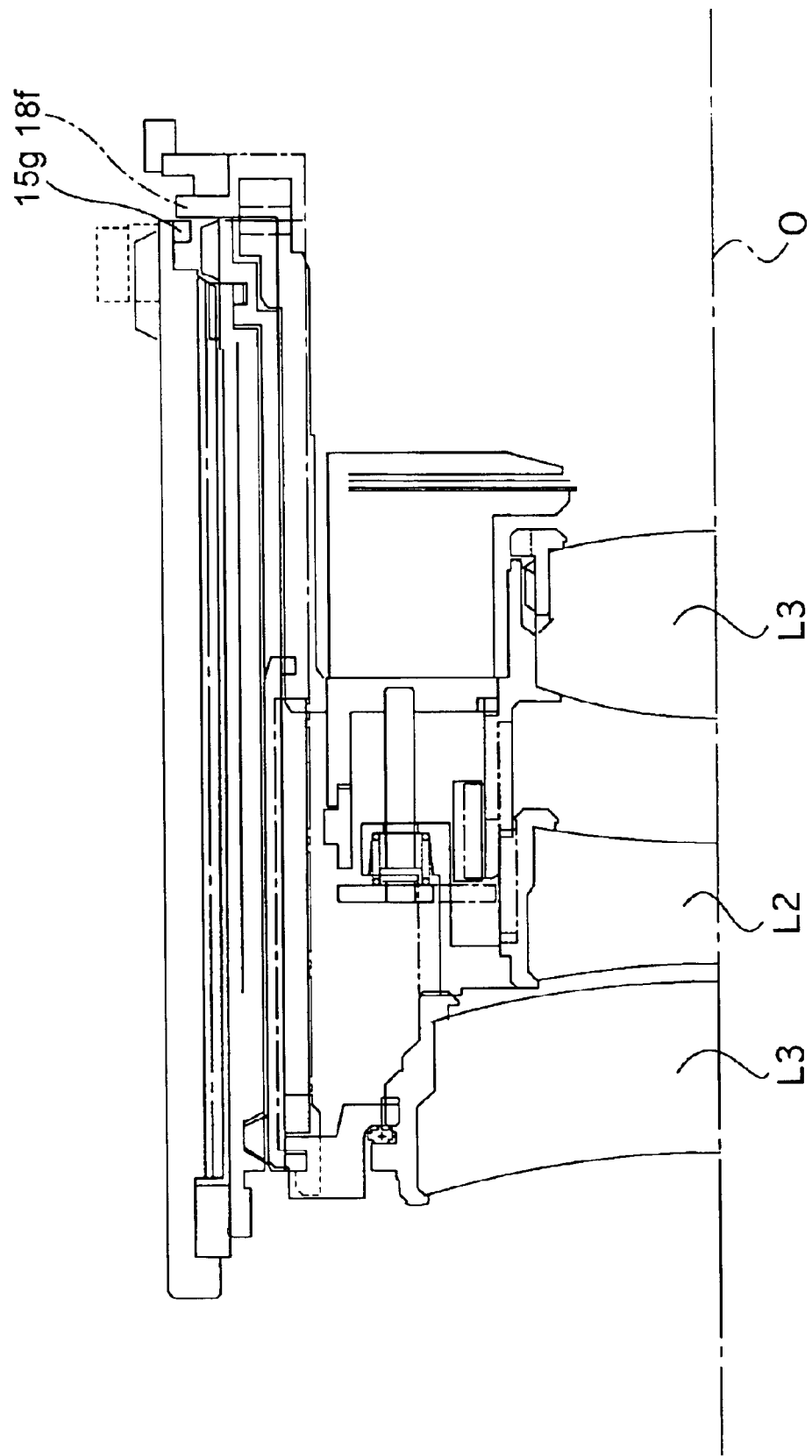
FIG. 44 is a view similar to that of FIG. 42, showing a comparative example of an assembly in the case where the switching groove of the switching ring does not include an assembling section.

FIG. 44 shows an comparative example of an assembly in the case where the switching groove 16c of the switching ring 16 does not include the assembling section 16cA. In this example, an assembly of the cam ring 15, the switching ring 16 and the first lens group support ring 17 cannot be drawn out from the first linear guide ring 18. Therefore, when the female helicoid 15c of the cam ring 15 is brought into engagement with the male helicoid 17a of the first lens group support ring 17, the male helicoid 17a of the first lens group support ring 17 cannot be engaged with the female helicoid 15c of the cam ring 15 because the plurality of engaging lugs (bayonet lugs) 15g of the cam ring 15 hit the outer flange 18f of the first linear guide ring 18.

The present invention can be applied not only to the zoom lens system shown in FIG. 1 of the above described embodiment of the zoom lens barrel 10 but also to a lens system having an ordinary switching mechanism as long as such a lens system includes: a linear guide ring, a rotatable ring, a switching ring and a moving frame, wherein the linear guide ring and the rotatable ring are coupled in a bayonet manner (in a manner so that the rotatable ring is freely rotatable relative to the linear guide ring and so that the rotatable ring and the linear guide ring are movable together along an optical axis) while the switching ring and the moving frame which rotate together with the rotatable ring are coupled in a bayonet manner (in a manner so that the switching ring is freely rotatable relative to the moving frame and so that the switching ring and the moving frame are movable together along an optical axis), wherein the moving frame and the rotatable ring are coupled in a helicoid manner, wherein a switching leaf is supported by the linear guide ring to be freely movable in a circumferential direction of the linear guide ring within a predetermined range of movement without moving along the optical axis relative to the linear guide ring, and wherein a switching-member moving groove is formed on an inner peripheral surface of the switching ring to be engaged with a follower projection which projects from the switching leaf.

As can be understood from the foregoing, according to the present invention, in a lens barrel wherein a linear guide ring and a rotatable ring are coupled in a bayonet manner (in a manner so that the rotatable ring is freely rotatable relative to the linear guide ring and so that the rotatable ring and the linear guide ring are movable together along an optical axis) while a switching ring and a moving frame which rotate together with the rotatable ring are coupled in a bayonet manner (in a manner so that the switching ring is freely rotatable relative to the moving frame and so that the switching ring and the moving frame are movable together along an optical axis), and wherein the moving frame and the rotatable ring are coupled in a helicoid manner, an assembling work for making a switching leaf supported by the linear guide ring to be freely movable in a circumferential direction of the linear guide ring within a predetermined range of movement without moving along the optical axis relative to the linear guide ring and further for engaging a follower projection which projects from the switching leaf in a switching-member moving groove which is formed on an inner peripheral surface of the switching ring can be performed without any difficulties arising.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens barrel comprising:
a linear guide ring linearly movable along an optical axis without rotating;

a moving frame which is supported by said linear guide ring to be linearly movable along said optical axis without rotating;

a male helicoid formed on an outer peripheral surface of said moving frame;

a rotatable ring which is coupled to said linear guide ring at a predetermined relative rotational position between said rotatable ring and said linear guide ring to be freely rotatable relative to said linear guide ring without moving along said optical axis relative to said linear guide ring;

a female helicoid formed on an inner peripheral surface of said rotatable ring, said female helicoid being engaged with said male helicoid;

a switching ring which is coupled to said rotatable ring at a predetermined relative rotational position between said switching ring and said rotatable ring to be freely movable along said optical axis relative to said rotatable ring and rotatable together with said rotatable ring, said switching ring being coupled to said moving frame to be freely rotatable relative to said moving frame without moving along said optical axis relative to said moving frame;

a switching member which is supported by said linear guide ring to be freely movable in a circumferential direction of said linear guide ring within a predetermined range of movement without moving along said optical axis relative to said linear guide ring; and a switching-member moving groove which is formed on an inner peripheral surface of said switching ring to be engaged with a follower projection projecting from said switching member, wherein said switching-member moving groove includes a first inclined section, a switching section, a second inclined section and an assembling section, in that order from rear to front of said zoom lens barrel, wherein said first inclined section is shaped so that a lead angle thereof is the same as that of the threads of said female helicoid of said rotatable ring and so that a direction of inclination of said first inclined section is opposite to that of said threads of said female helicoid of said rotatable ring, wherein said follower projection is inserted in said switching-member moving groove via an open rear end of said first inclined section, wherein said switching section is shaped to extend parallel to said optical axis from a front end of said first inclined section, wherein said second inclined section is shaped to extend parallel to said first inclined section from a front end of said switching section, and wherein said assembling section extends rearwards from a front end of the second inclined section to be parallel to said optical axis.

2. The zoom lens barrel according to claim 1, further comprising:

a first lens group, a second lens group and a third lens group, wherein each of said first, second and third lens groups is movable along said optical axis;

a second/third lens group support unit which supports said second lens group and said third lens group, wherein said moving frame serves as a lens support ring which supports said first lens group, and wherein said switching member is associated with said second/third lens group support unit so that forward and reverse movements of said switching member in said circumferential direction of said linear guide ring cause a distance between said second lens group and said third lens group to become wide and narrow, respectively.

3. The zoom lens barrel according to claim 2, wherein said second/third lens unit is linearly guided along said optical axis to perform zooming and focusing operations.

4. The zoom lens barrel according to claim 1, wherein said linear guide ring comprises a guide slot, in which said switching member is positioned, for guiding said switching member in said circumferential direction of said linear guide ring.

5. The zoom lens barrel according to claim 4, wherein said switching member is positioned in said guide slot so that an outer peripheral surface of said switching member is substantially flush with an outer peripheral surface of said linear guide ring.

6. The zoom lens barrel according to claim 2, wherein said rotatable ring comprises at least one cam for moving said second/third lens group support unit by rotation of said rotatable ring.

7. The zoom lens barrel according to claim 1, wherein said switching ring and said moving frame are coupled in a bayonet manner.

8. The zoom lens barrel according to claim 1, wherein said rotatable ring and said linear guide ring are coupled in a bayonet manner.

* * * * *